US012517060B2

(12) United States Patent
Palleva et al.

(10) Patent No.: US 12,517,060 B2
(45) Date of Patent: Jan. 6, 2026

(54) HANDHELD FASTENER REMOVAL INSPECTION DEVICE

(71) Applicant: Perfect Point EDM, Huntington Beach, CA (US)

(72) Inventors: William Palleva, Huntington Beach, CA (US); Dominick Mammolito, Huntington Beach, CA (US); Mervyn Rudgley, Huntington Beach, CA (US); James Becker, Huntington Beach, CA (US)

(73) Assignee: Perfect Point, EDM, Huntington Beach, CA (US)

( * ) Notice: Subject to any disclaimer, the term of this patent is extended or adjusted under 35 U.S.C. 154(b) by 224 days.

(21) Appl. No.: 18/356,563

(22) Filed: Jul. 21, 2023

(65) Prior Publication Data

US 2024/0027360 A1    Jan. 25, 2024

Related U.S. Application Data

(60) Provisional application No. 63/369,348, filed on Jul. 25, 2022.

(51) Int. Cl.
 *G01N 21/88* (2006.01)

(52) U.S. Cl.
 CPC .  *G01N 21/8851* (2013.01); *G01N 2021/8887* (2013.01)

(58) Field of Classification Search
 CPC .................. G01N 21/8851; G01N 2021/8887
 See application file for complete search history.

(56) References Cited

U.S. PATENT DOCUMENTS

| 4,598,998 | A | 7/1986 | Kamei |
| 7,173,692 | B2 | 2/2007 | Yasuda |
| 7,364,043 | B2 | 4/2008 | Ong |

(Continued)

FOREIGN PATENT DOCUMENTS

| CN | 104567722 | 3/2017 |
| JP | 10-073418 A | 3/1998 |

(Continued)

OTHER PUBLICATIONS

International Preliminary Report on Patentability, International Application No. PCT/US2023/070922, filing date Jul. 25, 2023, Date of Issuance of Report Jan. 28, 2025.

(Continued)

*Primary Examiner* — Jamil Ahmed
(74) *Attorney, Agent, or Firm* — Kevin Schraven; Anooj Patel; Hankin Patent Law, APC

(57) ABSTRACT

A fastener removal inspection device comprising: a housing, a diffuser, a display screen; a processor, a graphics processor, a digital image capture device, a power source, and a graphics processor. The graphics processor may be configured to overlay an offset overlay on a digitally displayed image of an inspection site. The display screen may be configured to display the inspection site, which may include a fastener being removed or to be removed, the offset overlay, and/or fastener setup data. The processor may be configured to process the fastener setup data and the offset overlay in order to determine an offset value from the offset overlay and said digitally displayed image.

10 Claims, 17 Drawing Sheets

(56) References Cited

U.S. PATENT DOCUMENTS

| | | | |
|---|---|---|---|
| 7,574,770 B2 | 8/2009 | Choi | |
| 8,606,540 B2 | 12/2013 | Haisty | |
| 9,067,690 B2 | 6/2015 | Pedigo | |
| 9,116,133 B2 | 8/2015 | Shuttleworth | |
| 9,157,735 B2 | 10/2015 | Haisty | |
| 9,724,787 B2 | 8/2017 | Becker | |
| 12,112,467 B2 * | 10/2024 | Brockway | G06V 10/40 |
| 2011/0128368 A1 | 6/2011 | Vertoprakhov | |

FOREIGN PATENT DOCUMENTS

| | | |
|---|---|---|
| JP | 2016-053545 A | 4/2016 |
| JP | 6612514 B2 | 9/2016 |
| JP | 2019-082463 A | 5/2019 |
| KR | 101203027 B1 | 3/2012 |

OTHER PUBLICATIONS https://www.hanleysmith.co.uk/aircraft-windshield-inspection/ Aircraft windshield bolt hole inspection equipment using a prism.
https://aip.scitation.org/doi/pdf/10.1063/1.5031619 Bolt hole eddy current (BHEC) used for detection of cracks within bolt holes after fastener removal.
https://www.zetec.com/bolt-inspection/.

* cited by examiner

HANDHELD FASTENER REMOVAL INSPECTION DEVICE

CROSS-REFERENCE TO RELATED APPLICATIONS

This U.S. Non-Provisional Utility Patent Application claims the benefit of and priority to U.S. Provisional Patent Application No. 63/369,348, filed on Jul. 25, 2022, by inventors William Palleva, Dominick Mammolito, and Mervyn Rudgley, the contents of which are expressly incorporated herein by this reference.

FIELD OF THE DISCLOSURE

The present disclosure, in general, relates to systems, methods, and devices for determining the damage to the structure of a removed fastener. More specifically, the present disclosure relates to a system and method of evaluating a structure and surface for damage or artifacts after a fastener has been removed. An inspection device allows for the fastener hole and surrounding structure to be assessed and, if needed, to rectify the damaged region, and restore the structure to its original structural integrity.

BACKGROUND

Aerospace fastener removal has typically used conventional drilling using a drill bit or electrical discharge machining (EDM) using, for example, e.Drill® (fastener removal equipment) Fastener Separation Technology (FST) systems. e.Drill® is an example of a very effective proprietary industrial surface treatment equipment that removes fasteners through controlled plasma treatment of conductive surfaces. A damaged fastener hole from fastener removal equipment is frequently a crescent artifact, often discolored, and at the location where the cut breaks through the fastener. This discoloration is due to the recasting and burning of the parent material, which indicates that a heat-affected zone (HAZ) has degraded the material's properties, and microcracking is an issue. Degradation to the material properties only occurs when the EDM cut breaks through the fastener's shank just below the head, allowing the electrode to spark and erode the material of the surrounding hole. Damage done by a conventional twist drill can is an out-of-round hole geometry or two non-concentric overlapping holes resembling an egg or snowman. The identification and rectification of damage are important because degradation of the surrounding parent material and the propagation of the microcracks can lead to premature failure of the structure.

Damage generally only occurs when the cutting or drilling is eccentric to the rest of the fastener and parent hole by more than 0.012 inches.

The rectification of either removal process may generally comprise drilling and reaming a larger hole, concentric to the original, to remove all the fastener hole's damaged portion(s). A damaged fastener hole, in which the damage is contained concentrically within a first oversize boundary, oversize drilling will rectify the damaged region. A damaged fastener hole that exceeds the boundary of the first oversize and is concentrically contained within the diameter of the second oversize boundary corresponding to that fastener, oversizing will rectify the damaged region and restore the parent structure to its original structural integrity.

The e.Drill® FST process (covered under U.S. Pat. Nos. 6,225,589; 8,178,814; 8,278,584; 8,963,040; 9,393,632; and 9,630,268; and International Patents) uniquely harnesses the Electro Discharge Machining (EDM) process to remove hard fasteners, typically from aircraft structures (but applicable to any mechanical fabrication). The process repetitively brings an erosion electrode in close and accurate proximity to the fastener head to be removed. The control system generates sparks between the electrode and the fastener, progressively eroding a cut into a fastener until it weakens, allowing for removal. The equipment is portable, enabling it to be taken to the structure, and the cutting head is hand-held, unique among EDM implementations.

The e.Drill® fastener removal equipment system includes a range of devices that ensure a concentrically cut on a fastener and normal to its head when used correctly. In such conditions, no damage will occur to the holes in the structure. However, in some cases, damage-free use of the device depends on the operator's diligence, so damage events rarely occur with diligence.

Existing solutions cannot automatically calculate an MRB (Materials Review Board) disposition or electronically log that information for later review, dispositioning, and instructions for rectifying the flaw to an acceptable record. An engineer typically determines such dispositions after inspection of the damage. Additionally, existing solutions do not readily provide automatic logging and upload of damage reports and location in quality and maintenance records for the structure damaged.

SUMMARY

To minimize the limitations in the prior art, and to minimize other limitations that will become apparent upon reading and understanding the present specification, the present disclosure discloses new and useful handheld fastener removal inspection devices, systems, and methods.

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

Aerospace fastener removal has typically used conventional drilling using a drill bit or electrical discharge machining (EDM) using fastener removal equipment, such as e.Drill® Fastener Separation Technology (FST) system. The present disclosure relates to systems, methods, and devices of a handheld fastener removal inspection device capable of inspection and image analysis of visible surface damage to a fastener hole. The present disclosure inspection system and method accounts for multiple fastener removal methods, discloses a method and device that identifies the existence and magnitude of damage, determines the necessary rectification, and logs a full report of the finding.

A fastener removal inspection device of the present disclosure may comprise: a housing, a diffuser, a display screen; a processor, a graphics processor, a digital image capture device, a power source, and a graphics processor. The graphics processor may be configured to overlay an offset overlay on a digitally displayed image of an inspection site. The display screen may be configured to display the inspection site, which may include a fastener being removed or to be removed, a fastener hole, the offset overlay, and/or fastener setup data. The processor may be configured to process the fastener setup data and the offset overlay in order to determine an offset value from the offset overlay and the digitally displayed image.

One embodiment may be a hole inspection system that may comprise: an image capturing system, an image processing system, a system for measuring concentricity, a system for identifying irregularities, a rectification analysis, a damage determination, a fastener hole, wherein the image capturing system is a digital capturing device configured to capture an image of a fastener hole, wherein the processing system evaluates parameters of the captured image of a fastener hole, wherein the processing system is configured to measure concentricity of a fastener hole, wherein the irregularity is a measure of structural material damage, wherein the damage determination is a measure of concentricity and irregularity, wherein the rectification analysis is a determination of corrective action of the damage determination. The hole inspection system wherein the digital capturing device may be configured to: accurately capture an image of a fastener hole, illuminate the fastener hole, maintain focal length, and hold the imaging device still. The hole inspection system, wherein the image processing system may be automatic. The inspection system, wherein the parameters of the captured image comprise: a fastener head position, a fastener head diameter, a fastener head type, and a fastener style. The inspection system wherein the inspection system comprises before a removal inspection, an after-removal inspection, and a fastener identification system, wherein the fastener identification system may be a table of manufacturers' fastener specifications. The hole inspection system, wherein the damage comprises: an oversize condition of the fastener hole, a structural integrity issue of the fastener hole, and a material integrity issue with the fastener hole. The inspection system, wherein the rectification may be the over-drill size of the fastener hole. The hole inspection system, wherein the rectification analysis may be referred to an offline decision-making authority. The hole inspection system, wherein the inspection system further comprises maintenance record data: wherein the maintenance record data comprises a date, a time, a defect size, a GPS location regarding the fastener hole, an irregularity, a rectification recommendation, an inspector ID, a fastener type, sub-assembly information, and an FAA Certification. The maintenance record, wherein the maintenance record comprises one or more unique identifiers/identification mechanisms, such as a bar code, a QR code, and or an RFID, wherein the bar code may identify the fastener hole damage determination and rectification analysis, wherein the WR code may identify the fastener hole damage determination and rectification analysis, wherein the RFID may identify the fastener hole damage determination and rectification analysis.

Another embodiment may be a hole inspection system that may comprise: an image capturing system, an image processing system, a system for identifying an irregularity, a rectification analysis, a damage determination, a fastener hole, a system offset, an offset overlay, wherein the image capturing system may be a digital capturing device configured to capture an image of the fastener hole, wherein the system offset may be determined by a manufacture specification of a fastener, wherein the offset overlay may be a representation of the fastener hole, wherein the processing system evaluates the captured image of a fastener hole and establishes the offset overlay representation of fastener hole, wherein the damage determination may be a measure of the difference between system offset and overlay offset, wherein the rectification analysis may be a determination of corrective action of the damage determination. The hole inspection system, wherein the digital capturing device may be configured to: accurately capture an image of the fastener hole, illuminate the fastener hole, maintain focal length, and hold the imaging device still. The hole inspection system, wherein the overlay offset comprises: the position and diameter of a fastener head and a fastener hole, wherein the fastener hole was removed via fastener removal equipment, such as the e.Drill®, or via another machine drilling system, the hole inspection system, wherein the damage determination further comprises a measure of the degree of damage. The hole inspection system, wherein the rectification analysis further comprises: a removal process offset, a recommended rectification, wherein the removal process offset may be based on an over-drill size of the fastener hole, wherein the recommended rectification may be based on structure material, size of the hole, and degree of damage. The hole inspection system, wherein the damage determination may be a measure of the center-to-center offset distance. The inspection system, wherein the inspection system further comprises maintenance record data: wherein the maintenance record may comprise a date, a time, a defect size, a GPS location regarding a fastener hole, an irregularity, a rectification recommendation, an inspector ID, a fastener type, sub-assembly information, and an FAA Certification. The maintenance record, wherein the maintenance record comprises a bar code, a QR code, and or an RFID, wherein the bar code may identify the fastener hole damage determination and rectification analysis, wherein the WR code may identify the fastener hole damage determination and rectification analysis, wherein the RFID may identify the fastener hole damage determination and rectification analysis.

Another embodiment may be a hole inspection system that may comprise: an image capturing system, an image processing system, a rectification analysis, a damage determination, a fastener hole, a head diameter, a head ring, an offset ring, a maintenance record, wherein the image capturing system may be a digital capturing device configured to capture the image of the fastener hole, wherein the head ring may be a manufacture specification of a fastener head diameter, wherein the offset ring may be determined by the electrode used for fastener removal, such as with the e.Drill® FST, wherein the damage determination may be based on an offset ring to head ring clearance, wherein the rectification analysis includes whether the hole will need further inspection once the fastener has been removed. The maintenance record comprises a date, a time, a defect size, a GPS location regarding a fastener hole, any irregularities, any rectification recommendations, inspector ID, fastener type, sub-assembly information, and FAA Certification. Wherein the maintenance record comprises a bar code, a QR code, and or an RFID, wherein the bar code may identify the fastener hole damage determination and rectification analysis, wherein the WR code may identify the fastener hole damage determination and rectification analysis, wherein the RFID may identify the fastener hole damage determination and rectification analysis.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure. As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1:
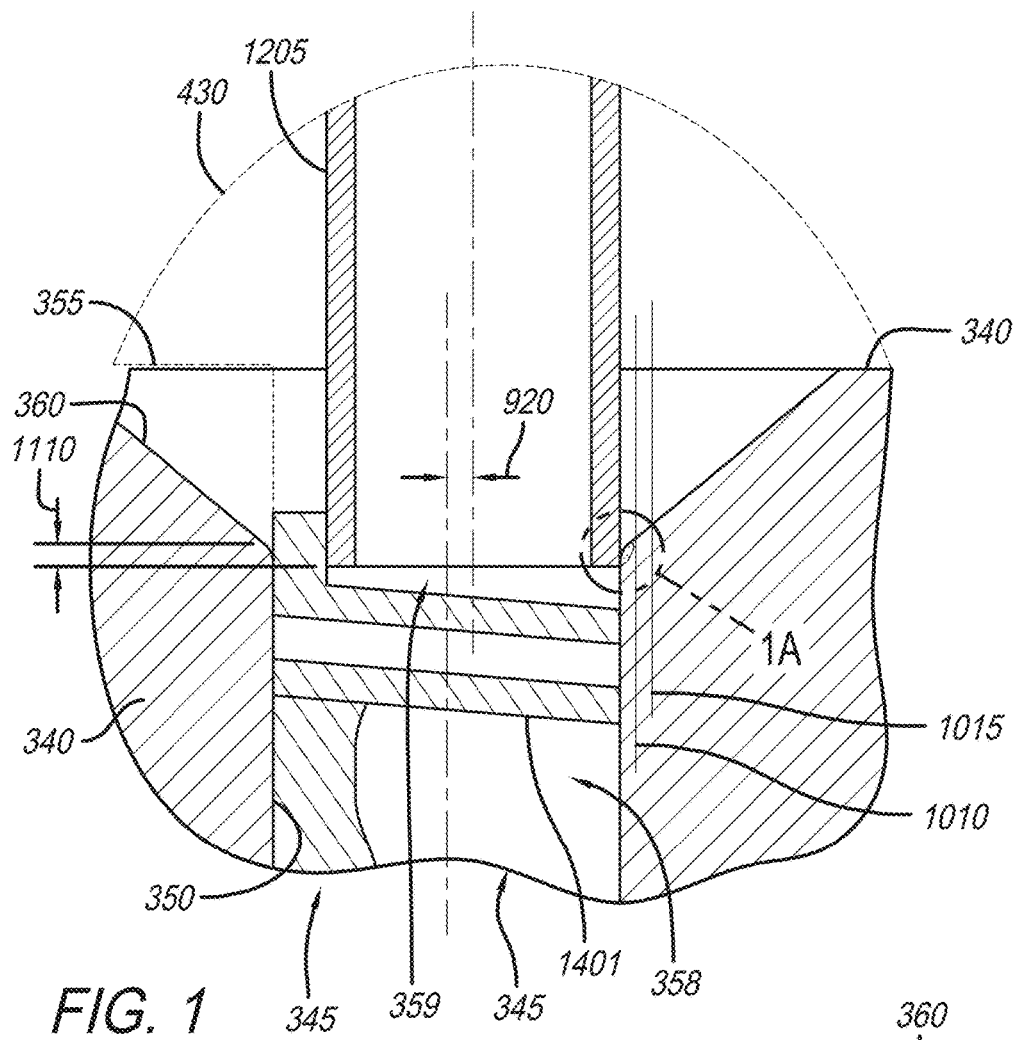
FIG. 1 is an illustration of one embodiment of a typically damaged hole and rectification oversizing.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-30% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

As used herein, the term "hole" refers to any blind hole, through-hole, interrupted hole, simple hole, counterbore hole, spot face hole, countersink hole, counter drill hole, tapered hole, screw clearance hole, tapped hole, and threaded hole.

As used herein, the term "inspection" refers to any act of scrutiny, carefully examining, or looking at something.

As used herein, the term "inspection device" refers to any system, device, or vehicle that uses a non-destructive testing technique to inspect an object, including digital devices, cameras, the human eye, advanced imaging techniques, sensors, and/or any mechanical differentiation of an image.

As used herein, the term "housing" refers to any system or device that encloses and protects the components or pieces of delicate equipment, such as electronics, including, but not limited to, cases made of plastic, composite, metal, or any material used for a case.

As used herein, the term "hand grip" refers to any system, device, or portion of a device, for holding and physical engagement.

As used herein, the term "diffuser" refers to any system, device, or any material or action that diffuses or scatters light in some manner to transmit soft light, such as, but not limited to, reflecting light from a white surface, or using translucent material to include ground glass, Teflon®, opal glass, and greyed glass.

As used herein, the term "screen" or "display" refers to any system or device configured to display an image, including, but not limited to, a liquid crystal, light-emitting diode ("LED"), organic light-emitting diode ("OLED"), virtual reality equipment, and projectors.

As used herein, the term "processor" refers to any system or device for doing the logic circuitry that responds to and processes the basic instructions that drive a computer, including smart phones, digital camera systems, and any system capable of processing images, algorithms, software, and calculations.

As used herein, the term "graphics processor" refers to any system, device, or electronic circuit designed to manipulate and alter memory to accelerate the creation of images in a frame buffer intended for output to a display or other type of device.

As used herein, the term "lighting assembly" refers to any single or array of illuminated components that may or may not be combined with electronics, such as a printed circuit board or substrate. Examples of a lighting assembly may be LED lighting arrays and LCD arrays. The lighting assembly may be as simple as a single LED or other type of light source that may be powered by a battery. Alternatively, the lighting assembly may be a complex pattern of LEDs set out in an optimal pattern, which depends on the use.

As used herein, the term "smart phone" refers to any device, system, or a mobile phone that performs many computer functions, typically having a touchscreen interface, internet access, and an operating system capable of running downloaded software applications.

As used herein, the term "Material Requirements Board ("MRB")" refers to reviewing and resolving defects and nonconforming conditions in assemblies, documenting and determining if abnormalities are related to engineering issues, and ensuring corrections will not negatively affect the functionality of systems.

As used herein, the term "over size drilling," "over-drill," or "reaming" refers to widening a bore or a fastener hole with a special tool, ultimately enlarging the diameter of the original hole.

FIG. 1 is an illustration of one embodiment of a typically damaged hole and rectification oversizing. As shown in FIG. 1, a damaged portion 780 to the hole may occur when a fastener remover is misused (or slips) and not held concentric with the fastener when removed. The damage to fastener holes 345 and fastener aperture 350 caused by the fastener remover is evident with damaged portion 780, often discolored, and may be at the location where the cut breaks through the fastener 358. This discoloration is due to the recasting and burning of the parent material, which indicates that a heat-affected zone (HAZ) of a damaged portion 780 has degraded the material's properties, and microcracking may also be present.

FIG. 1 shows that the fastener 358 may have a flush head 430 (which is typically the first portion of the fastener that is removed, or an inset head 355.

Degradation to the material properties of the fastener aperture 350 and/or the surface structure 340 may typically occur when the EDM cut breaks through the shank 359 of fastener 358, below the fastener head 355, 430 or near the countersunk fastener head 360, allowing the electrode 1205 to spark and erode the surface structure 340 material surrounding fastener hole 345. The integrity of the surface structure 340 or in the fastener hole 345 may be determined by the formation of the thermal altered layers created by the EDM process. The EDM process involves the transference of a controlled electrical discharge between an EDM electrode 1205 and the cut fastener head 430 and or fastener 358 with cut head 435. The current applied to the cut fastener head 430 during this discharge melts and vaporizes the metal, therefore creating thermal altered layers of the fastener hole 345.

As shown in FIG. 1, the HAZ damaged portion 780, beneath the surface structure 340, may be displayed with the oversize indicator 1 1010 and the oversize indicator 2 1020 rectification boundaries that dictate whether a first or second oversizing procedure will be sufficient for removing the degraded portion of the structure and returning it to its original mechanical properties.

When an ideal removal is managed, there is not damage 1401 to the original hole 345. Thus, fastener 358 is completely removed from the original hole 345. The ideal removal includes full removal of the fastener head 355, 430, 360, leaving just the original fastener hole 345 without damaged portion 780.

Figure 1A:
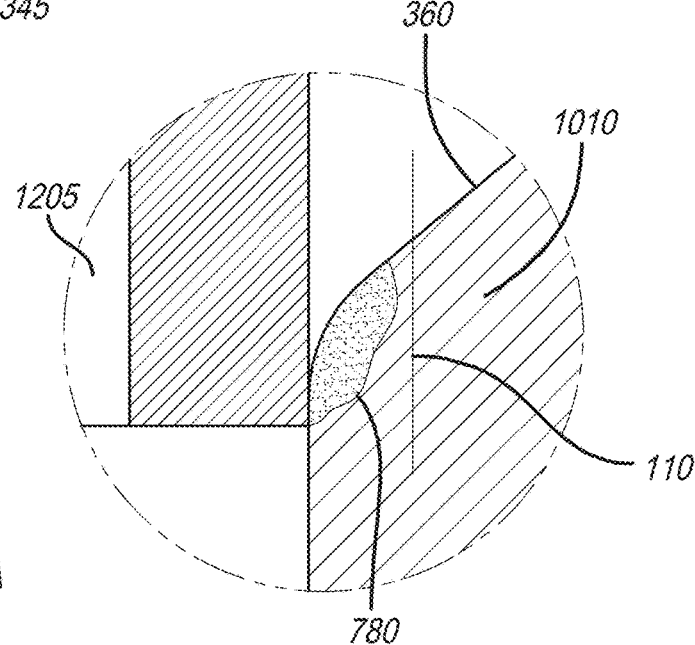
FIG. 1A is a close-up view of one embodiment of a typically damaged hole showing the heat-affected zone.

As shown in FIG. 1, the EDM electrode 1205 may be placed in the fastener hole 345, where the cut fastener head 430 may have been removed. The oversize indicator 1 1010 and oversize indicator 2 1015 indicate the projected oversize drill area encompassing the damaged portion 780. As depicted in FIG. 1A, damaged portion 780 would be completely rectified if the EDM electrode 1205 is to remove the damaged portion 780.

FIG. 1A is a close-up view of one embodiment of a typically damaged hole showing the heat-affected zone. FIG. 1A is a blown-up view of a portion of FIG. 1 and shows damaged portion 780, which is discolored, to the surface structure 340.

The damaged portion 780 is the layer that has been heated to the point of a molten state but is not quite hot enough to be ejected and flushed away. The EDM process has altered the metallurgical structure and characteristics in fastener hole 345 and/or the surface structure 340 as it is removed by the un-expelled molten metal rapidly cooled by fluid during the flushing process and resolidifying in the cavity. This damaged portion 780 may include some expelled particles that have solidified and have been re-deposited on the surface before being flushed out. The discoloration may be due to the recasting and burning of the parent material. The damaged portion 780 may have degraded the material's properties, and microcracking may be an issue.

As shown in FIG. 1A the damaged portion 780 may extend beyond the edge of the EDM electrode 1205. EDM electrodes 1205 are typically made from highly conductive and arc erosion-resistant materials such as graphite or copper. These properties make the EDM electrode 1205 susceptible to wear. Tool wear rates result in inaccurate machining, which may lead to damaged portion 780. In some instances, a larger EDM electrode 1205 is used to account for electrode wear, in that case causing the damage of damaged portion 780. The nominal depth of removed material 1110 typically varies as the EDM electrode 1205 wears. Degradation to the material properties usually occurs when the EDM cut breaks through the fastener's shank just below the fastener head 355, 430 or countersunk fastener head 360, allowing the electrode to spark and erode the surface structure 340 material surrounding fastener hole 345.

Figure 2:
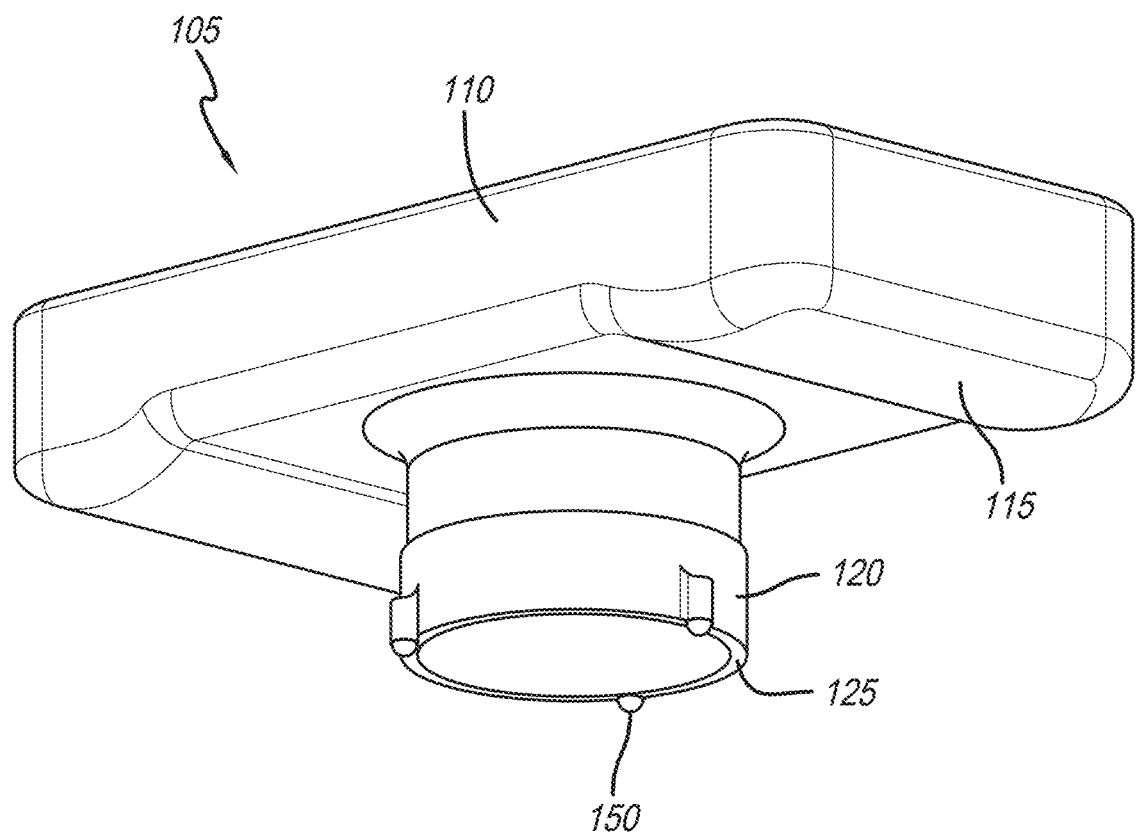
FIG. 2 is an illustration of one embodiment of an inspection device.

FIG. 2 is an illustration of one embodiment of an inspection device. In one embodiment, an inspection device 105 may be a portable and handheld camera system. The inspection device 105 may include a housing 110, one or more hand grips 115, a diffuser 120, and tripod feet 150. Because the inspection device 105 may preferably be intended for use with the aerospace industry and used to store the electronic components of the inspection system 105, the housing 110 may preferably be made from any durable material such as polycarbonate and acrylonitrile butadiene styrene. In preparation for inspection, the diffuser 120 may softly illuminate the surface structure of a fastener with cut head or fastener hole. The diffuser 120 may preferably be configured to use tripod feet 150. The tripod feet 150 may each be a single or ballpoint that is protruding from the rim surface 125 of the diffuser 120.

As shown in FIG. 2, there may be three tripod feet 150 protruding from the rim surface 125 of the diffuser 120. Although three is the optimal number, additional feet may be employed. The tripod feet 150 may allow the inspection device 105 to rest evenly against a surface structure during an inspection. The rim surface 125 may be configured to have the tripod feet 150 rest against a surface structure 340, where a fastener with cut head or a fastener hole is inspected. As shown in FIG. 1, the inspection device 105 may have a hand grip 115, or multiple hand grips 115, which may allow for handheld use and portability of the inspection device 105. This configuration may allow an inspection device to photograph and survey the area of a cut fastener head, a fastener hole, or a fastener cut head and calculate the distance between the center point of the fastener cut head or the fastener hole after a fastener has been drilled out to determine if a breakthrough has occurred and if there is a potential for damage before removal of a fastener.

The device of the present disclosure may inspect a fastener hole after a cut fastener head and fastener with cut head have been removed, for any damage or flaws caused to an aerospace surface structure using optical techniques, machine vision, and image processing on a handheld inspection device 105 such as but not limited to a smartphone, tablet, or other type of computer.

The inspection device 105 may be able to detect irregularities in the surface structure and fastener hole; such irregularities may include material degradation, concentricity of the fastener hole, and if an irregularity, flaw, or a finding of concentricity failure, the inspection system and device of the present disclosure may record and report a disposition and a recommended rectification action that may restore strength to the structure.

The inspection device 105 and system of the present disclosure may utilize camera technology in modern smartphone devices and image analysis technology combined with damage analysis software. The configuration of the inspection device 105 and system of the present disclosure may determine a magnitude of a defect in the surface structure or fastener hole and what drill oversize will be required to correct the defect and return the structure to its original mechanical integrity. A damage analysis software may consider the size of the fastener hole and the material of the surface structure and may advise the user on the rectification recommendation. Inspection device 105 may also record and log an MRB report of the damage, date, and GPS location of the fastener hole. The inspection device 105 may also gather pertinent data by machine-readable means (such as bar-code, QR code, RFID, etc.) as desired and when available. Such information could include, but is not limited to, inspector ID, fastener type, sub-assembly information, maintenance authority, etc. A simplified version of the inspection device 105 may utilize a camera of a modern smart device but will not require any processing or analysis by the device.

Figure 3:
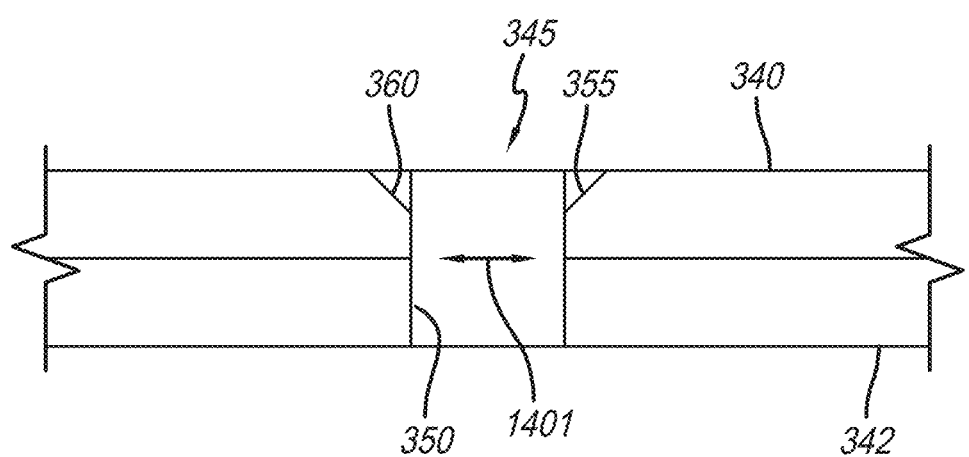
FIG. 3 is an illustration of a fastener hole and surface structure.

FIG. 3 is an illustration of a fastener hole and surface structure. As shown in FIG. 3, a fastener hole 345 may be a fastener aperture 350 that holds the surface structure 340 to the supporting structure 342 using a fastener, not shown in FIG. 3. As further shown in FIG. 3 the fastener hole 345 may have a countersunk fastener head seat 360, or it may have a flush fastener head seat 355. The fastener hole 345 may have a fastener aperture 350. The fastener hole 345 may have an ideal removal size with no damage 1401. Typical fastener apertures 350 may vary with application, and the type and size of fastener aperture 350 does not limit the present disclosure. Furthermore, the present disclosure is not limited to the fastener hole 345, having a countersunk fastener head seat 360, or a flush fastener head seat 355.

Figure 4:
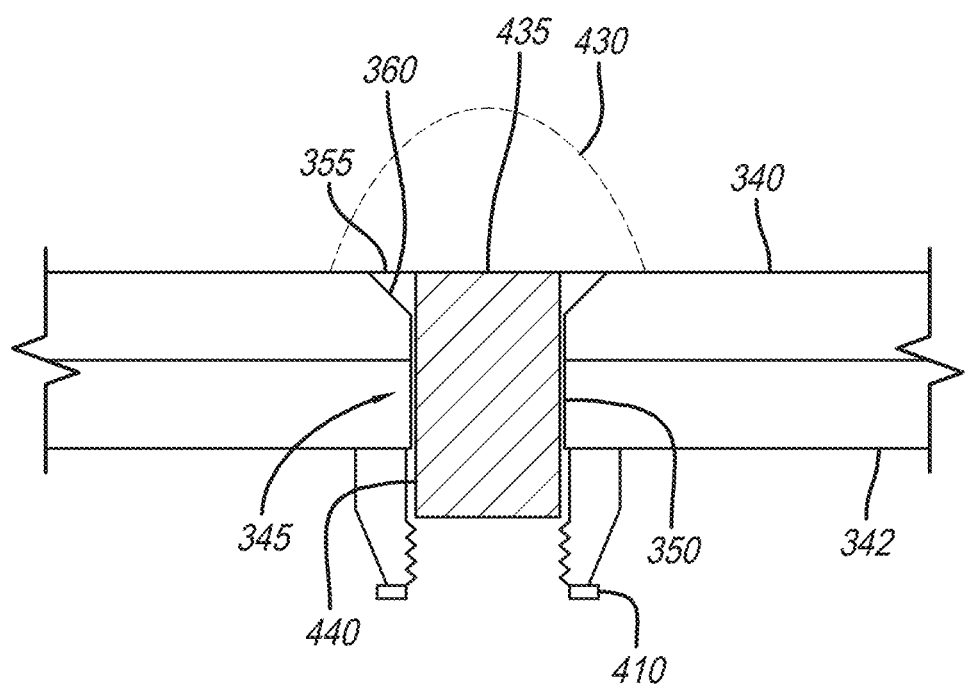
FIG. 4 is an illustration of a fastener with the head cut in a fastener hole and surface structure.

FIG. 4 is an illustration of a fastener with the head cut in a fastener hole and surface structure. As shown in FIG. 4, the surface structure 340, the supporting structure 342, and fastener hole 345 have a fastener with cut head 435 remaining in the fastener hole 345, and with the cut fastener head 430 representing the removed head of a fastener and the fastener threads 440 remain matingly engaged to the fastener aperture 350, and the retaining nut 410. This represents a typical situation in which inspection device 105, as described in the present disclosure, is designed to inspect. As shown in FIG. 4, a countersunk fastener head seat 360 or a flush fastener head seat 355 do not limit the inspection device 105 ability to assess the surface structure 340 or the fastener hole 345 with a fastener with cut head 435 remaining in the fastener hole 345.

Figure 5:
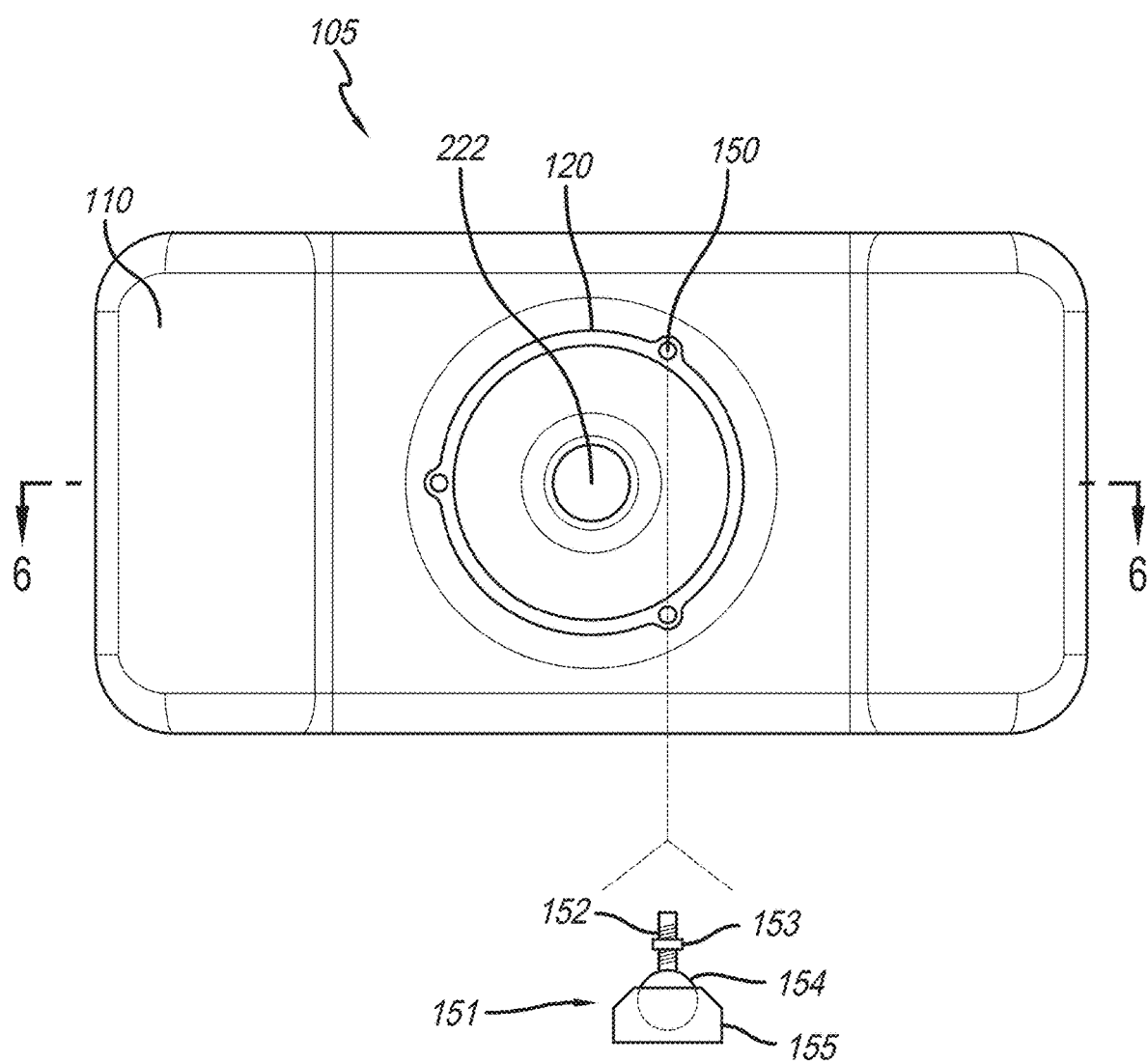
FIG. 5 is an illustration of a top view of one embodiment of the inspection device.

FIG. 5 is an illustration of a top view of one embodiment of the inspection device. As shown in FIG. 5, there may be three tripod feet 150, but the function of the tripod feet 150 may be represented by any number of tripod feet 150, or no tripod feet. The tripod feet 150 may also be substituted by a circular rubber base or normalizing foot 151. Normalizing feet, such as normalizing foot 151 are supports that attach to the base of a wide range of items. A normalizing foot 151 may comprise a threaded adjusting screw 152, a adjusting lock nut 153, a ball joint 154, and a base foot 155. A normalizing foot may be adjustable through, but not limited to, the turning of a threaded adjusting screw 152 attached to the base foot 155. An adjusting lock nut 155 may be used to lock the normalizing foot 151 in place while an image is captured. A ball joint 154 allows for placement of the inspection device 105 on a range of uneven surfaces while remaining in place. Use of one or more normalizing foot 151 may allow the inspection device 105 to be leveled in an optimal manner above the inspection site by adjusting one or more normalizing foot 151 until level. In this embodiment, the diffuser 120 may be centrally situated on the inspection device 105 and the housing 110. The diffuser 120, as shown and preferred, may be symmetrically located around auxiliary lens 222. Although not required, having the diffuser 120 symmetrically situated around the auxiliary lens 222 may improve the symmetrical lighting of the surface structure, fastener hole, or fastener with cut head to be inspected. The auxiliary lens 222 may magnify the surface structure, fastener hole, or fastener with cut head to be inspected. It is preferable, by not required, to have the auxiliary lens 222 in the center of the diffuser 120, which may provide a more accurate and precise representation of the surface structure, fastener hole, or fastener with cut head to be inspected.

Figure 6:
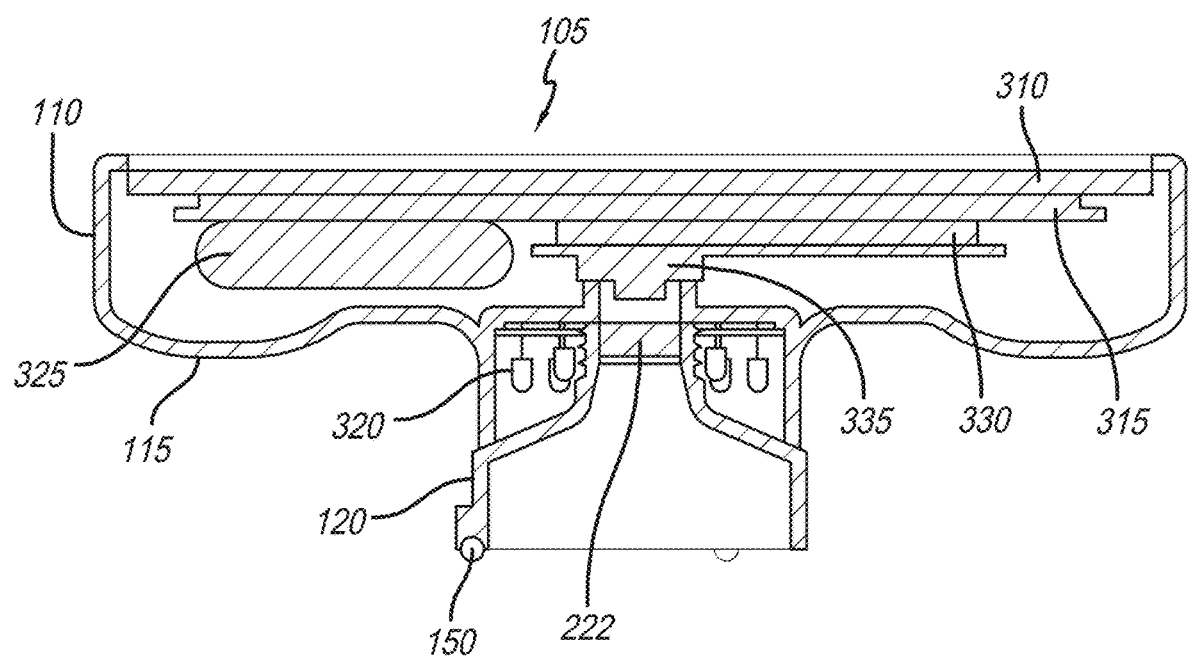
FIG. 6 is an illustration of a cross-sectional view of one embodiment of the inspection device.

FIG. 6 is an illustration of a cross-sectional view of one embodiment of the inspection device. FIG. 6 is an illustration of the device shown in FIG. 5 from A to A'. In one embodiment, an inspection device 105 may comprise housing 110, one or more hand grips 115, a diffuser 120, plurality of tripod feet 150, auxiliary lens 222, display screen 310, processor 315, power source 325, graphics processor 330, camera module or digital capture device 335, and a lighting assembly 320. Lighting assembly 320 may preferably be an LED lighting assembly. One or more hand grips 115 may be raised from the housing 110 in order to provide an ergonomic handhold during the use of the inspection device 105. The diffuser 120 may be of any shape that may produce a soft and even light on the surface structure being examined. The primary purpose of the diffuser 120 is to eliminate shadows, soften the image and allow the image of the surface structure, fastener hole, or fastener with cut head to be inspected to be accurately captured by evenly distributing the light from the lighting assembly 320. The tripod feet 150 may allow the diffuser 120 to be balanced on the surface structure, and held still, when using the inspection device 105. The auxiliary lens 222 magnifies the surface structure, fastener hole, and/or fastener with cut head being inspected. The auxiliary lens 222 may also adjust the focal length of an inspection device's 105 existing camera lens. Screen 310 may be any digital display and/or touchscreen display, which may rely on different technologies to present the image of the surface structure, fastener hole, or fastener with cut head, a fastener inspection with an offset measurement, an overlayed of a fastener cut indicator, a center fastener cut indicator, a center of fastener cut head, and a command language (CL) offset to a user. The most common are LCD screens that use liquid crystal cells to display content and LED displays based on Light Emitting Diode technology. The processor 315 may be any logic circuitry or electronics processing unit that responds to and processes the basic instructions that may drive the inspection device 105. Power source 325 may be a plugged-in power adapter or a rechargeable battery that is not designed to be removed. Alternatively, the power source 325 may be an interchangeable external battery that minimizes downtime and increases mobility by allowing the user to keep a secondary battery charged on standby that can be swiftly and easily replaced if needed. Using an interchangeable power source 325 may eliminate the need for a wired connection. The graphics processor ("GPU") 330 may be a specialized electronic circuit designed to manipulate and alter memory to accelerate the creation of images in a frame buffer intended for output to a display device. The GPU may be capable of overlaying an overlay of a captured image with an offset measurement, an overlay of a fastener cut indicator, a center fastener cut indicator, a center of fastener cut head, and a CL offset to a user. GPUs are commonly used in embedded systems, mobile phones, personal computers, and workstations. A digital capture device 335, which may typically be a digital camera or camera module, is a component or device capable of converting an image of the surface structure, fastener hole, or fastener with cut head being inspected into an image that can be processed by a processor 315 or graphics processor 330. Typical components capable of converting an image of the surface structure, fastener hole, or fastener with cut head being inspected include but are not limited to, charge-coupled devices ("CCDs"), complementary metal oxide semiconductor ("CMOS") devices, and/or charge injection devices ("CIDs"). A lighting assembly 320 may supply the high-intensity inspection lighting needed for the camera module or digital capture device 335. A typical digital capture device 335 component requires sufficient light to accurately inspect and represent the image of the surface structure, fastener hole, or fastener with cut head being inspected. An image of the surface structure, fastener hole, or fastener with cut head being inspected with insufficient light may lack contrast and brightness, severely limiting the inspection device 105 ability to inspect the surface structure, fastener hole, or fastener with cut head and appropriately evaluate the concentricity and or integrity of the fastener hole.

Figure 7:
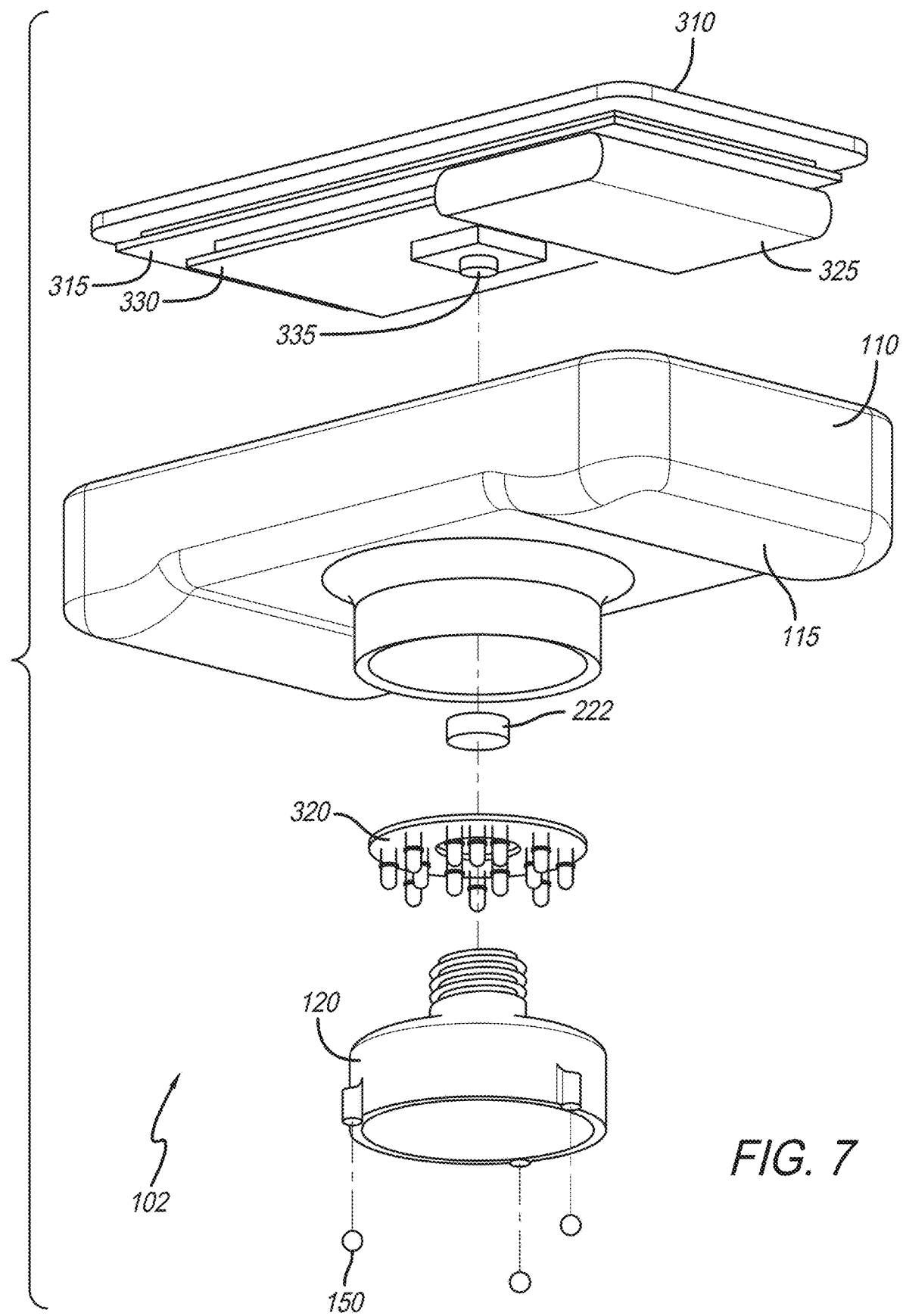
FIG. 7 is an illustration of an exploded view of one embodiment of the inspection device.

FIG. 7 is an illustration of an exploded view of one embodiment of the inspection device. The inspection device 105 may comprise a main housing 110 with a centralized digital capture device 335, and handle grips 110 to ensure stability, comfort, and ease of use. The screen 310, processor 315, which may be a Principal Component Analysis (PCA) processor, which is one of the statistical techniques frequently used in signal processing to the data dimension reduction or to the data decorrelation, power source 325, graphics processor 330, and digital capture device 335 are preferably located within the main housing 110. The lighting assembly 320 may illuminate the fastener cut head, the fastener with cut head, the surface structure, or a fastener hole holes while the auxiliary lens 222 magnifies the inspection site. The tripod feet 150 may accommodate flat, uneven, and/or contoured surfaces such that the user may encounter. As currently shown in FIG. 7, the diffuser 120 may be removably attached using, but not limited to, threaded connections. As shown in FIG. 7, the diffuser 120 is attached using a threaded connection. In alternative embodiments, the diffuser 120 may attach to the inspection device 105 using magnets, clips, friction, and/or any mechanism for removably or permanently attaching to the inspection device 105. The lighting assembly 320 may be a printed circuit board, as shown in FIG. 7, or may be individual LED components. LED components may be but are not limited to 5 mm, SMD, and segmented LEDs. The lighting assembly 320 may use any LED capable of illuminating the surface structure and capable of providing a contrast between an undamaged and a damaged surface structure, fastener hole, and or fastener with cut head. The illumination caused by the lighting assembly 320 may be provided by any type of electric or battery powered light source, including fluorescent, incandescent, or high-intensity discharge, electric discharge, electroluminescence, chemiluminescence, and the like.

Typically, the digital capture device 335 may be a device that utilizes an image sensor to register visible light as an electronic signal. These digital cameras do not use photochemical film to capture stills or video. The electronic signal is recorded and processed using processor 315. The digital capture device 335 may be mounted to the graphics processor 330 or removably attached using any standard ribbon cable connections or SMD ball grid array connections. The GPU 330 must be capable of accepting the captured image of surface structure, fastener hole, and/or fastener with cut head and analyzing the captured image relative to a manufacturer's referenced specifications. The GPU 330 may also be capable of manipulating and altering memory to accelerate the creation of images in a frame buffer intended for output to a display device. A simple embodiment of this would be an overlay of a fastener cut indicator, a center fastener cut indicator, a center of fastener cut head, or a CL offset to a captured image. The processor 315 may automatically control the capturing of the image from the digital capture device and receive instructions from the GPU if an image is not adequately focused. The processor 315 may also control the intensity of the lighting assembly 320 if more or less illumination is required. As an alternative, one embodiment may have interchangeable auxiliary lens 222, Lighting assembly 320 configurations, and diffusers 120 that may accommodate a wide range of fasteners applications.

Figure 8:
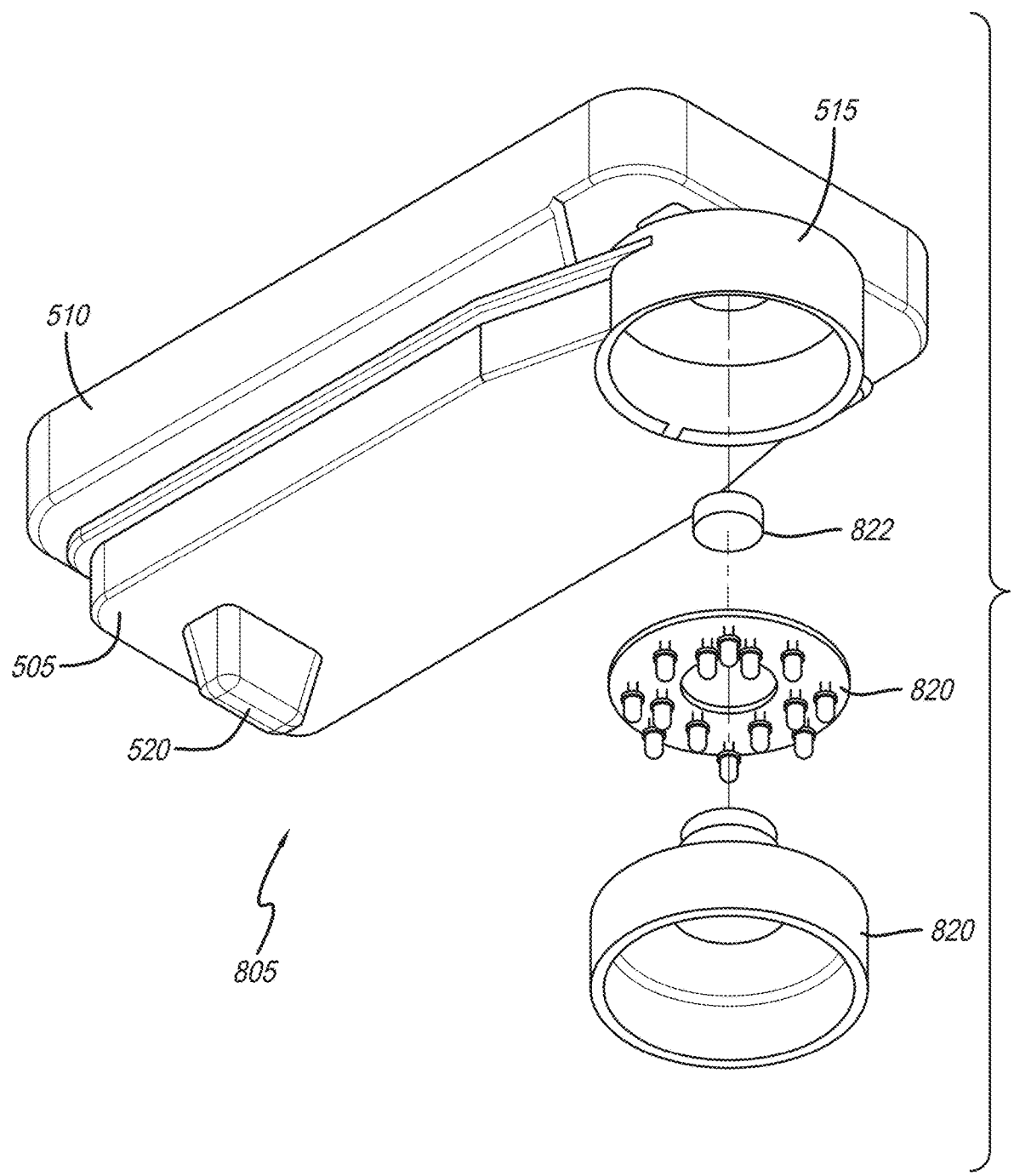
FIG. 8 is an illustration of an exploded front view of another embodiment of the inspection device that is a removable attachment affixed to an imaging device, such as a smartphone or tablet.

FIG. 8 is an illustration of an exploded front view of another embodiment of the inspection device that is a removable attachment affixed to an imaging device, such as a smartphone or tablet. In one embodiment, the inspection device 805 may be a removable attachment assembly 505, smartphone 510, attachment housing 515, supporting leg 520, diffuser 820, lighting assembly 820, and an auxiliary lens 822. As shown in FIG. 8, inspection device 805 may be a separate and removable attachment assembly 505 removably attached to a smartphone 510. The attachment assembly may preferably be made from a rugged plastic material to protect the internal electronics. Although a tablet is the preferred image-capturing device, due to processing power, there are alternative image-capturing systems other than a smartphone that may be used, such as a digital camera, a computer, or any other device capable of capturing or streaming digital images. The attachment housing 515 houses the auxiliary lens 822 and lighting assembly 820. Support leg 520 may maintain horizontal orientation on surfaces as the inspection device 805 operates. In this configuration, the diffuser 820 is offset from the center of the inspection device to accommodate the offset camera of a smartphone 510. This configuration does not change to operation or configuration of the lighting assembly 820 or the auxiliary lens 222 within the attachment housing 515 and the diffuser 820. This configuration allows for flexible, simple, and portable use of the inspection device 805.

Figure 9:
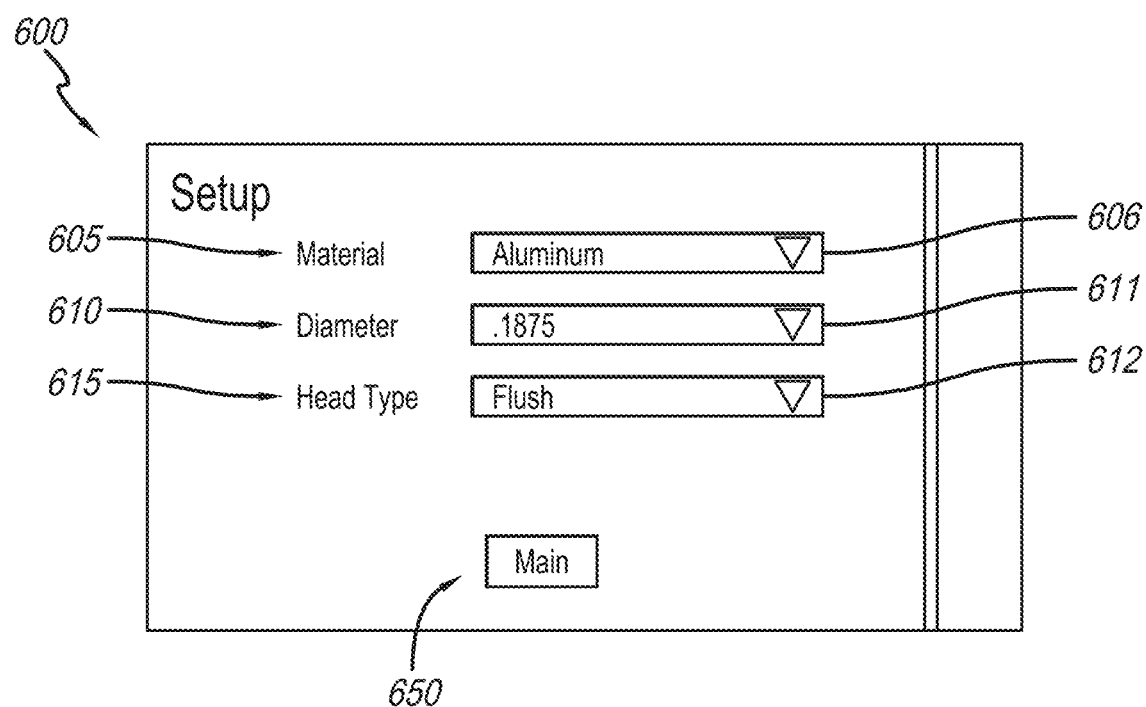
FIG. 9 is an illustration of one embodiment of the main menu display.

FIG. 9 is an illustration of one embodiment of the main menu display. The fastener type setup screen 600, which may be displayed on the display screen of the device of the present disclosure, may include a material 605 drop-down (i.e., expandible) menu 606, a diameter 610 drop-down menu 611, a head type 615 drop-down menu 612, and a style 620 drop-down menu 613, and main selection.

For the selection of material 605, the material drop-down menu 606 may allow a user to select from various types of material, such as metallic or composite surrounding materials. Material 605 selection allows a user to select the type of material the surface structure and fastener hole may comprise. Material 605 selection may comprise a table of predefined manufacturer alloys for inspection.

For the selection of diameter 610, the diameter drop-down menu 611 may allow the user to select or input the desired diameter. The drop-down menu 611 allows for diameter selections that range from three sixteenths (3/16) of an inches to five eighths (5/8) of an inch.

For the selection of head type 615, the head type drop-down menu 612 may allow the user to select the type of fastener head that was or will be removed, such as a protruding head or a flush head. Although three parameters are shown, it should be understood that the set up may be completed with more or less input from the user. As shown in FIG. 9, the device is set up to inspect a 3/16 diameter shank fastener with a flush head installed in an aluminum structure.

When the setup parameters are completed, the user may select the main selection 650 to save and exit.

Figure 10:
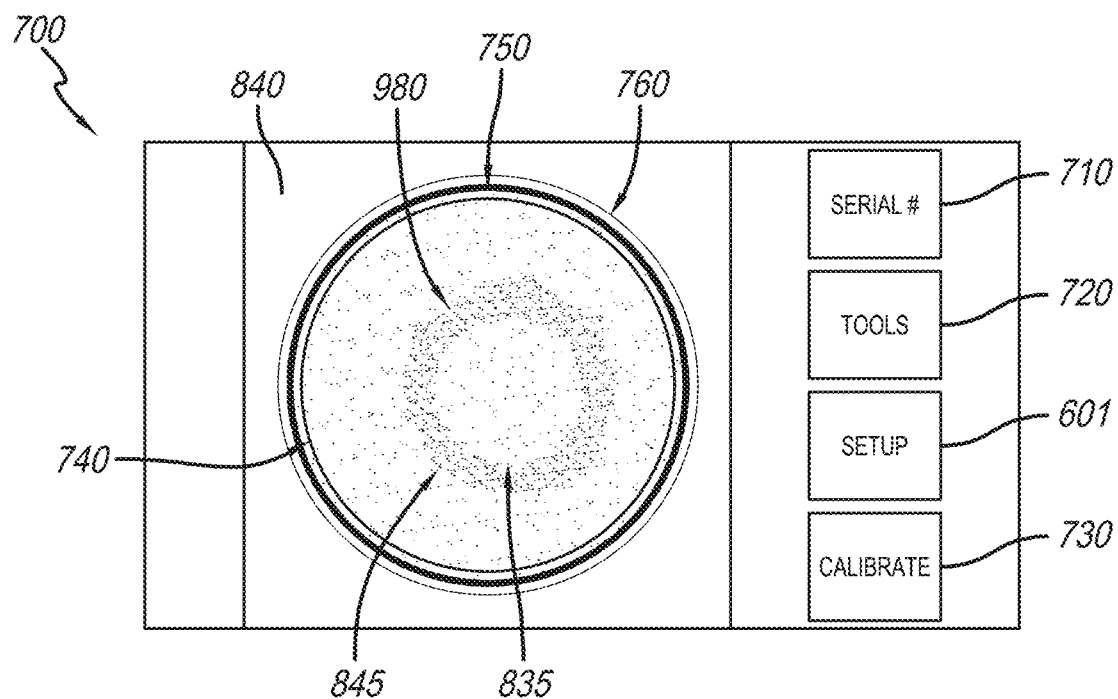
FIG. 10 is an illustration of one embodiment of the inspection display looking down at a cut fastener head.

FIG. 10 is an illustration of one embodiment of the inspection display looking down at a cut fastener head. The inspection screen 700 may include serial number selection 710, tools selection 720, fastener setup selection 601, and calibrate selection 730. When a user selects one of these, they are taken to a different screen related to what they selected. The serial number selection 710 automatically generates a serial number of the removed fastener to document the rectification of the fastener hole following its removal. The tool selection 720 allows for access to additional developer settings such as contrast, edge detection thresholds, and adjustment of the search field boundaries. These features will be hidden and not accessible to non-admin users. The fastener setup selection 601 takes a user to set up screen 600, where the task specific parameters may be input. The calibrate selection 730 takes the user to a calibration screen to run a calibration routine. The inspection device may run a calibration routine from the calibrate selection 730 to accurately scale the captured image 770 at all zoom levels. The calibrate selection 730 may use a known dimension circular feature such as a hole, gauge pin, or other means. The calibration may cycle through each zoom level analyzing the known dimension item, and scale accordingly. Calibration should preferably be completed at least once during initial setup but may be performed at any time to ensure accuracy. Although the selections shown in FIG. 10 are softkeys on a touch screen, the selection may be any button, physical or digital, that allows the user to access the various screens.

FIG. 10 also shows how the display screen of the device of the present disclosure displays the overlayed captured image 770 of the fastener during an active inspection by the device of the present disclosure. The image 770 may comprise inner tolerance ring 740, fastener head indicator 750, outer tolerance ring 760, fastener with cut head 835, damaged material 980, and fastener hole 845, In one embodiment of inspection device, the inspection device may automatically overlay an inner tolerance ring 740 approximately centered on the fastener hole 845 based on the parameters input in the fastener setup screen 600. The fastener head indicator 750 is the area where the fastener with cut head 835 is occupied. The inspection device may also automatically overlay an outer tolerance ring 760 that is also centered on the fastener with cut head 835 based on the parameters input in the fastener setup screen 600. The captured image 770 is the image that is presented from the digital capture device, which may be a single image or a stream of images. The damaged material 980 is the measured damage that occurred when the fastener was removed by the electrode. This damage may be on the surface structure 840 or may be that of the fastener hole 845.

Figure 11:
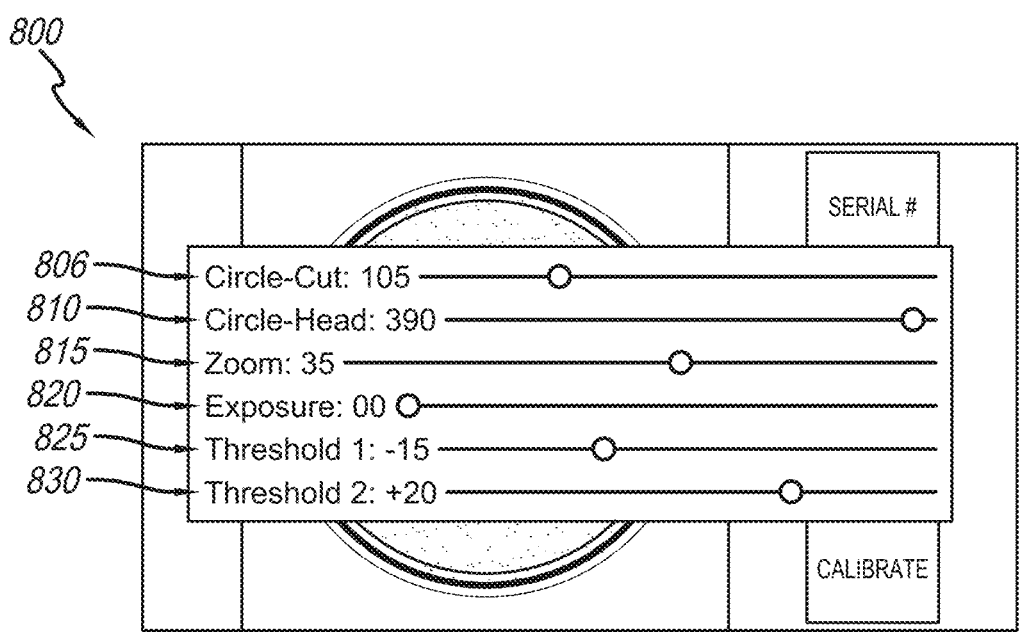
FIG. 11 is an illustration of one embodiment of the tool menu.

FIG. 11 is an illustration of one embodiment of the tool menu. The tools menu display 800, which, as shown, may overlay the image 770, may include adjustments during the inspection of a removed fastener/fastener hole, and may include the following: circle-cut 806, circle-head 810, zoom 815, exposure 820, threshold 1 825, and threshold 2 830. The circle-cut 806 may adjust the inspection screen's inner tolerance and outer tolerance rings. The circle-head 810 allows for manual adjustment of the search field used by the edge detection algorithm to locate the head of the fastener. Circle-head 810 may be used to locate the cut grove.

Zoom 815 may adjust the focal length of a camera lens to make the captured image larger and/or closer. The exposure 820 may adjust the exposure of the digital capture device. The analysis software may use threshold 1 825 and threshold 2 830. As shown, each tool has a sliding scale that may be adjusted and reset by the user.

Figure 12:
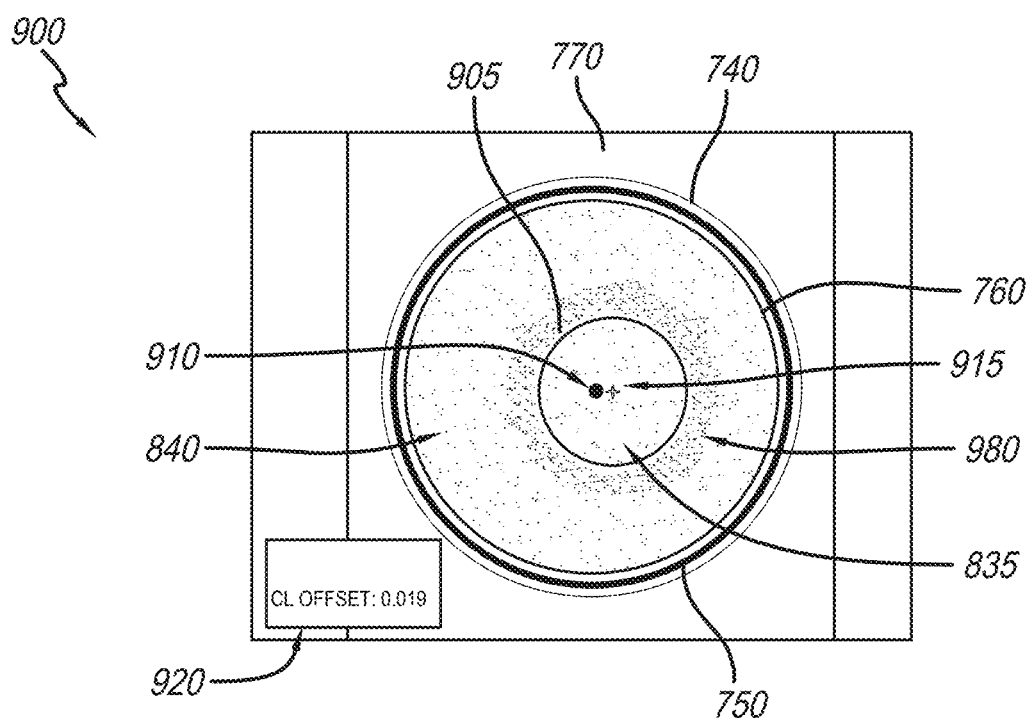
FIG. 12 is an illustration of one embodiment of a cut offset measurement display.

FIG. 12 is an illustration of one embodiment of a cut offset measurement display. The offset measurement screen 900 may show image 770, which may include a fastener cut indicator 905, a center of fastener cut indicator 910, a center of fastener cut head 915, a CL offset 920, which may be the measured cut offset, a fastener head indicator 750, a fastener with cut head 835, damaged material 780, outer tolerance ring 760, inner tolerance ring 740, and surface structure 840. The captured image 770 may be displayed with the fastener cut indicator 905, which may be overlayed on the fastener with cut head 835. The center of the fastener cut indicator 910 establishes the center of the fastener cut indicator 905 for measurement. The center of the fastener cut head 915 shows the center of the fastener with cut head 835. The CL offset 920 is determined by the difference in fastener cut indicator 905, and the fastener cut head 915. Any value of CL offset 920 greater than 0.000 in/cm indicates an error in concentricity and may indicate a need for over drill of the fastener hole to remove the damaged material.

In one embodiment, the inspection device may capture image 770 and survey the fastener cut head 835 and calculate the distance between the center point of the center of fastener cut head 915 or drilled hole and that of the fastener head to determine if a breakthrough or damaged material 780 has occurred or exists and if there is a potential for damage before removal of the fastener. If a flaw is found, the inspection device may report a rectification action to restore strength to the fastener hole or the surface structure 840. In some cases, disposition could be determined at the time of inspection or could be referred to a decision-making authority for review. The inspection device may also record information and location regarding fastener identification and any defects, logging the information in maintenance records for the aircraft or sub-component under inspection.

Figure 13:
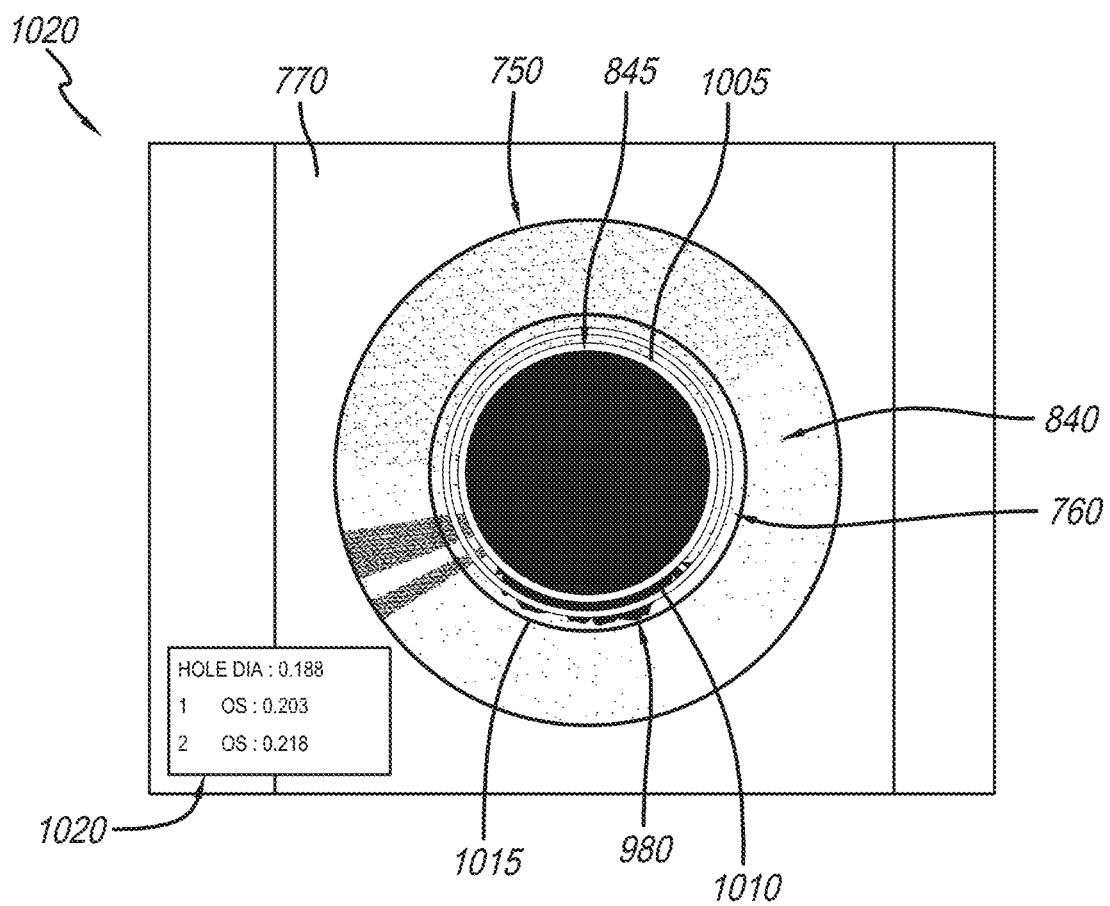
FIG. 13 is an illustration of one embodiment of the oversize command display.

FIG. 13 is an illustration of one embodiment of the oversize command display. The oversize command display 1000 may comprise image 770 that shows damaged material 980 and has an overlay that may include fastener head indicator 750, hole indicator ring 1005, oversize indicator 1 ring 1010, oversize indicator 2 ring 1015, and parameter output display 1020. In one embodiment, as shown in FIG. 13, the resulting image and information are displayed on-screen after completing the oversized measurement function. The hole indicator 1005 may be the diameter of the fastener cut or removed from the fastener hole 845. The oversize indicator 1 ring 1010 represents an area that would encompass an oversize drill rectification of diameter 1 if completed, and the oversize indicator 2 ring 1015 represents an area that would encompass an oversize drill rectification of diameter 2 if completed. The oversize indicator 1 ring 1010 and oversize indicator 2 ring 1015 may be overlays to the captured image 770 produced by the graphics processor. The damaged material 980 represents oversized drilling that would be unsatisfactory and require a greater diameter. If the damaged material 980 exceeds the oversize indicator 1 ring 1010 boundary but is contained within the oversize indicator 2 ring 1015 then the appropriate drill may be selected to ensure the removal of all damaged material 980. Preferably, the inspection device may suggest a second oversize rectification procedure conducted to remove any degraded area in the structure and return it to its original structural integrity.

Figure 14A:
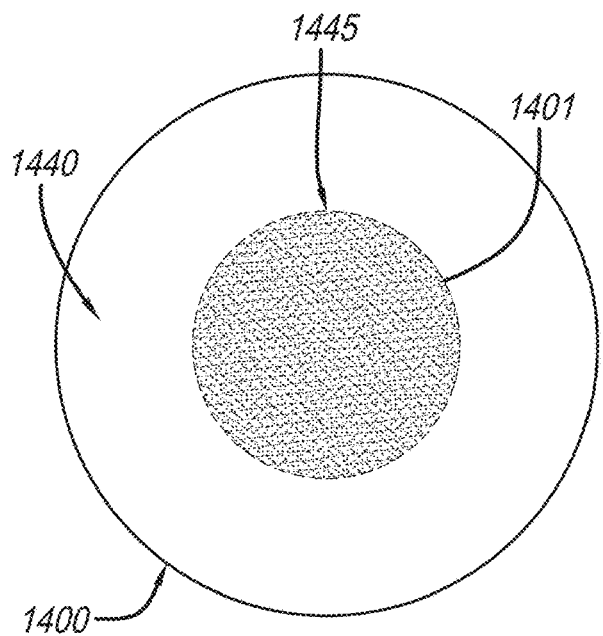
FIG. 14A is an illustration of an undamaged fastener hole.

FIG. 14A is an illustration of an undamaged fastener hole. As shown in FIG. 14A, after fastener removal, the inspected area 1400 is analyzed with the inspection device of the present disclosure and is found to be undamaged. As shown in inspected area 1400, the fastener was removed from fastener hole 1445, and neither the hole 1445 nor the surface structure 1440 was damaged. No over drilling is necessary.

Figure 14B:
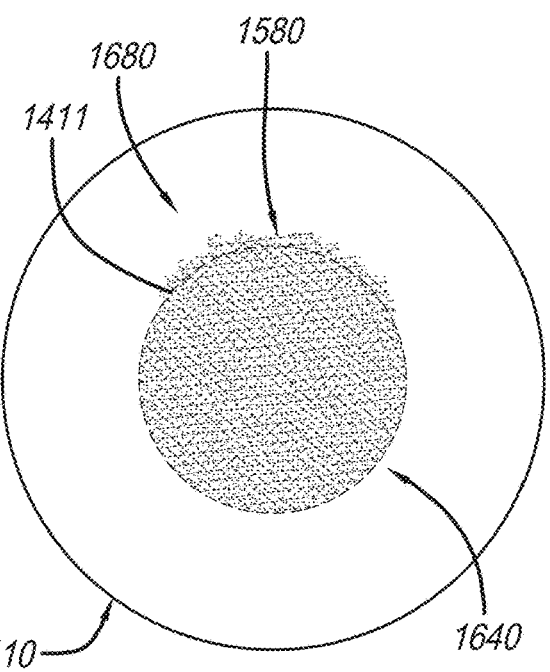
FIG. 14B is an illustration of a fastener hole damaged by a twist drill.
Figure 14C:
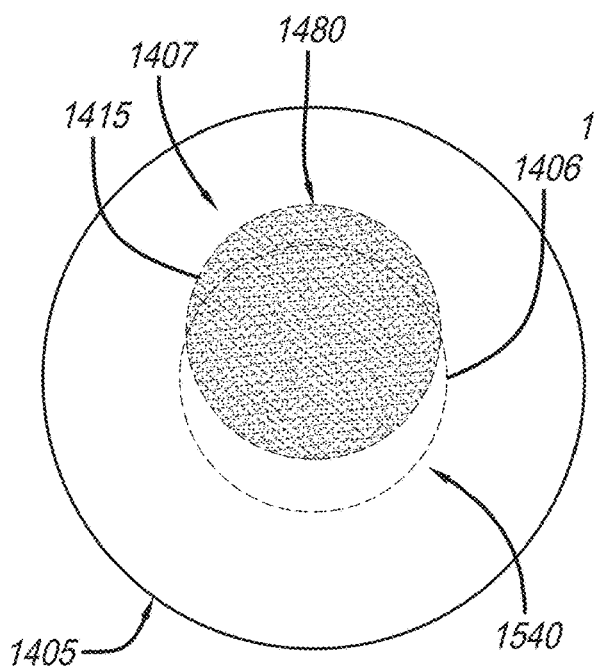
FIG. 14C is an illustration of a fastener hole damaged by an electrical discharge machining system.

FIG. 14B is an illustration of a fastener hole damaged by a twist drill. Inspected area 1410 shows that fastener hole 1680 and or surface structure 1640 have been damaged during the fastener removal process via twist drill removal. Ideal twist drill removal ring 1411 represents what would be expected if the twist drill removal process did not damage the fastener hole 1680 or the surface structure 1640. The damaged material 1480 caused by the twist drill removal process may be nonuniform and random, as shown in FIG. 14C. Damaged material 1480, which may appear as out-of-round or oblong portion between the surface material 1640 and fastener hole 1680 and exceeding the bounds of the ideal twist drill removal ring 1411 removed fastener hole.

FIG. 14C is an illustration of a fastener hole damaged by an electrical discharge machining system. Inspected area 1405 shows the fastener hole 1480 after fastener removal and shows that there is a crescent shaped artifact of damaged material 1407, which may have an out of round appearance. In this case, the damaged material 1407 is primarily to the surface structure 1540, but the hole 1480 has also been damaged. The ideal EDM removal ring 1406 represents what would be expected if the EDM process did not damage the fastener hole or the surface structure 1540. The crescent shaped artifact damage 1407 represents the damage caused by the EDM removal process, which is shown as eccentric ring 1415. Ring 1415, as shown, may be offset from the Ideal EDM ring 1406. Upon inspection, the damaged material is identified and can be over drilled appropriately.

Figure 15:
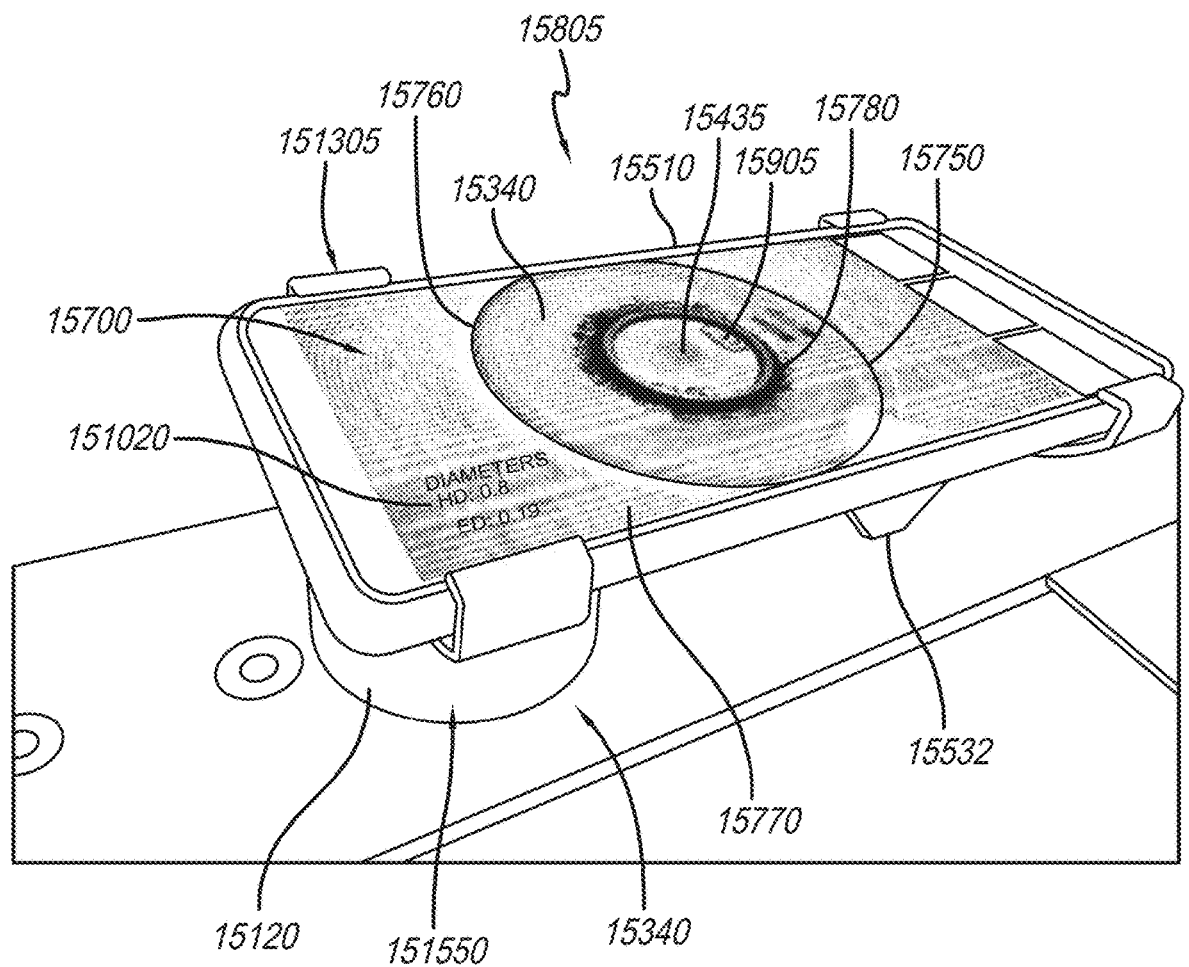
FIG. 15 is an illustration of a top view of another embodiment of the device and system of the present disclosure.

FIG. 15 is an illustration of a top view of another embodiment of the device and system of the present disclosure. As shown in FIG. 15, inspection device 15805 may comprise or be attached to a smartphone 15510. Smartphone 15510 may provide the graphics and electronics processing as well as the digital camera that takes the image of the area to be inspected.

The smartphone 15510 may be physically connected, removably, as preferred, or permanently, to inspection device attachment 151305. As shown, inspection device attachment 151305 may frictionally attach to smartphone 15510, such that the smartphone 15510 is held in place with the smartphone camera lined up over diffuser 15120. Other attachment mechanisms that may be used include fasteners, snaps, magnets, and adhesives.

Preferably, inspection device 15805 may further comprise lighting assembly 151550, which provides illumination through diffuser 15120 to the surface structure 15340 that is being inspected. Inspection device 15804 may also comprise supporting leg 15532, which allows the device to rest in an even and level manner on the surface structure 15340 during inspection. The display 15700 of the smartphone 15510 may face up to the user as the inspection is done. The display 15700 may be LCD, LED, OLED, and/or equivalents thereto. As shown in FIG. 15, the display 15700 shows captured image 15770 displaying surface structure 15340 (which is shown in FIG. 15 both in the captured image 15770 and as the surface structure 15340 upon which inspection device 15700 is resting), fastener with cut head 15435, fastener head indicator 15750, outer tolerance ring 15760, damaged material 15780, fastener cut indicator 15905, and parameter output display 151020, which may show the measured diameters of outer tolerance ring 15760 (shown as HD at 0.5) and of the fastener cut indicator 15905 (shown as ED at 0.19). FIG. 15 shows that the fastener with cut head 15435 still has remaining portions in the fastener hole.

FIG. 15 shows an embodiment of the inspection device utilizing a smartphone 15510 to display captured image 15770 for the inspection device, or as part of the inspection device. The diffuser 15120 and its internal lighting assembly 151550 provide a diffused light to the area being inspected such that, as shown, the area being inspected is clearly visible in the captured image 15770. In FIG. 15, the inspection device is not yet centered on the fastener that was removed.

Figure 16:
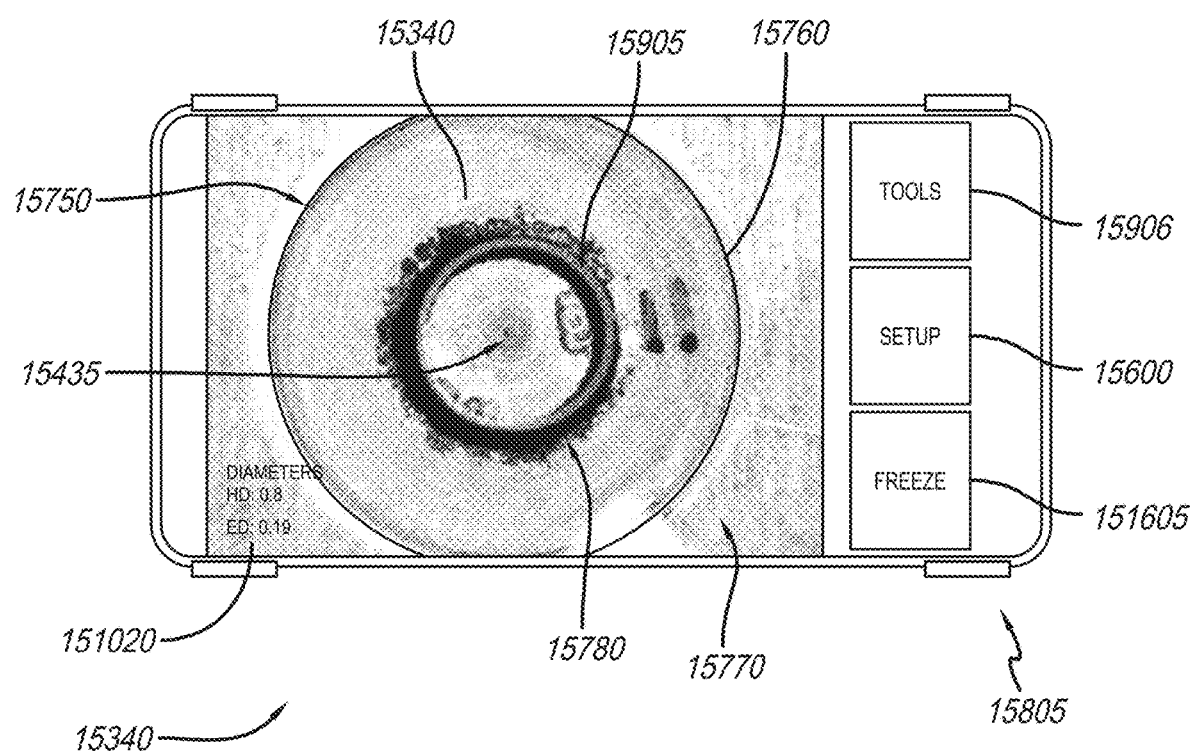
FIG. 16 is an illustration of a top view of another embodiment of the device and system of the present disclosure showing a large display screen.

FIG. 16 is an illustration of a top view of another embodiment of the device and system of the present disclosure showing a large display screen. FIG. 16 shows the area to be inspected is lined up correctly with the camera of inspection device 15805, such that the fastener with cut head 15435 is centered and aligned with fastener cut indicator 15905 and fastener head indicator 15750 is centered and aligned with outer tolerance ring 15760. As shown in FIG. 16, captured image 15770 also displays surface structure 15340 and damaged material 15780, which is shown just to the outside of fastener cut indicator 15905. The inspection device is preferably able to both display the damaged material 15780 clearly to the user and suggest an over drill size to use to correct the defect.

In one embodiment, inspection device 15805 may allow the user to make on-screen adjustments to the image, such as brightness, exposure, zoom, fastener cut indicator 15905 diameter, and outer tolerance ring 15760 diameter while using the offset measurement feature. inspection device 15805 may also allow the user to make on-screen adjustments to the display, such as zoom, fastener cut indicator 15905 thickness and/or opacity while using a visual "Go" or "No Go" feature. The device may allow the user to freeze the display of the streamed and captured image using the freeze button 151605, which may allow a user to make a more straightforward and precise measurement in a static rather than dynamic image.

In one embodiment, as shown in FIG. 16, a simplified version of the inspection device 15805, where the inspection device 15805 may overlay a fastener cut indicator 15905 and outer tolerance ring 15760 diameters while using the offset measurement feature. This device may allow an operator to input a fastener's known head diameter and the EDM electrode used to cut the fastener head off. In this embodiment, the user may position the fastener cut indicator 15905 concentric to the outer tolerance ring 15760 and determine whether the cut is contained within the outer tolerance ring 15760, providing a "GO" or "NO GO" condition.

An outer tolerance ring 15760 may or should be approximately 0.020 inches or larger in diameter than the fastener head/fastener head indicator 15750 to allow the entire fastener with cut head 15435 to be visible and account for dimensional variation due to tolerancing. For example: to check that a cut offset has not exceeded 0.010 inches radially, a ³⁄₁₆ (−6) nominal fastener with a 0.305-inch head diameter, the user will input the 0.305-inch diameter value and select the 206-0 electrode, which has an inner diameter of 0.129 in. An inspection device 15805 may display an outer tolerance 15760 rings with a diameter approximately 0.020 inches larger than the fastener head at 0.325 inches and a fastener cut indicator 15910 0.020 inches larger than the inner diameter of the EDM electrode used to cut set to 0.149 inches. A simplified embodiment of the inspection device 15105 may require a user to make a "GO" or "NO GO" judgment call based on whether the cut is contained within the fastener cut indicator 15905.

Figure 17:
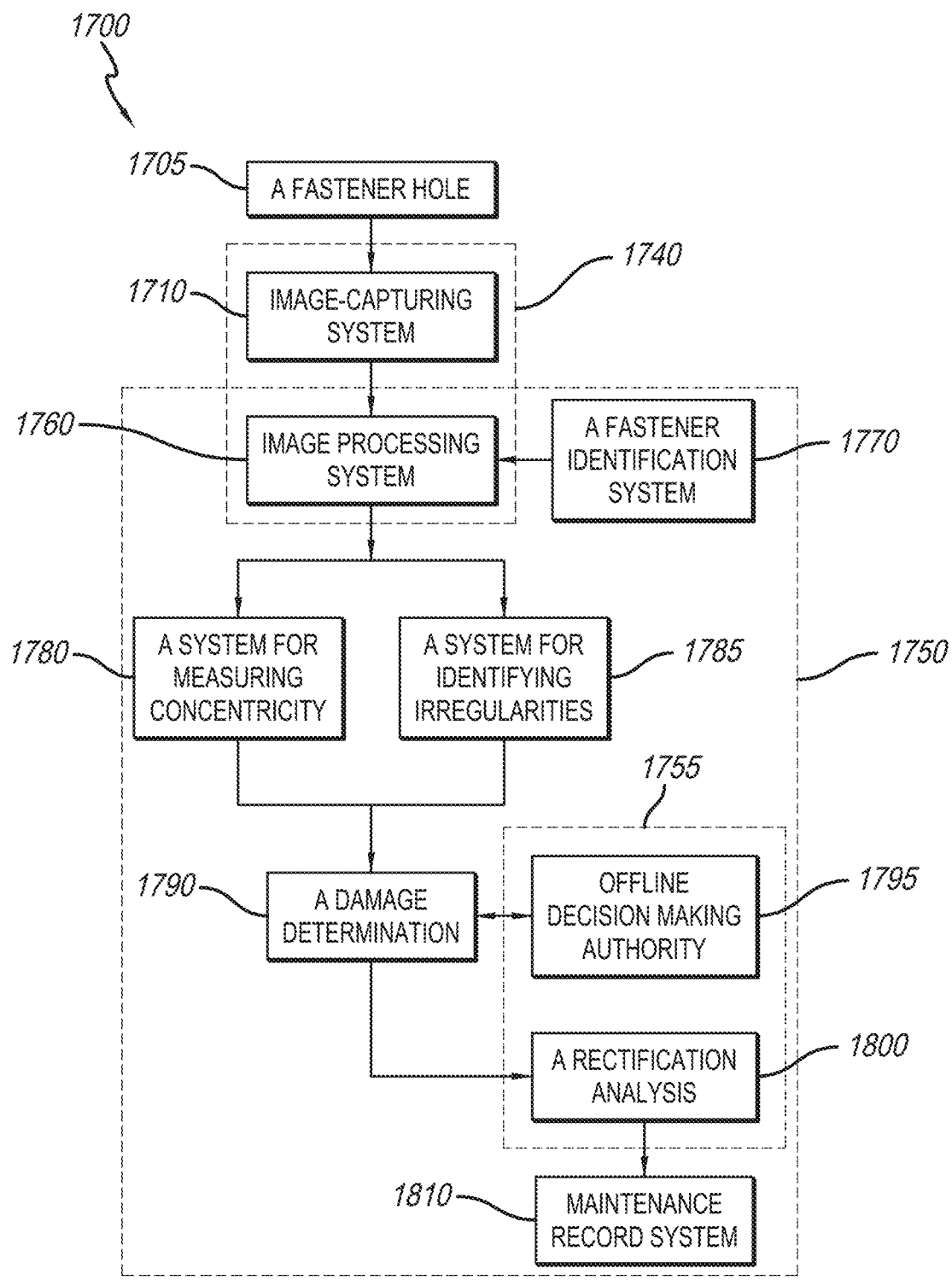
FIG. 17 is a system block diagram of one embodiment of a hole inspection system.

FIG. 17 is a system block diagram of one embodiment of a hole inspection system. The hole inspection system 1700 of the present disclosure is generally configured to inspect holes made related to fastener removal that may comprise a fastener hole 1705, an image capturing system 1710, an image processing system 1760, a fastener identification system 1770, a system for measuring concentricity 1780, a system for identifying irregularities 1785, a damage determination 1790, an offline decision-making authority 1795, a rectification analysis 1800, a record encoding system 1820, and a maintenance record 1810.

The fastener hole 1705 may be, but is not limited to, holes related to anchors, bolts, locking bolts, hex bolts, collars, screws, security screws, nuts, hex nuts, pins, rivets, and the like. The fastener hole 1705 represents an empty volume in which a fastener connects two or more objects. Image-capturing system 1710 may preferably comprise one or more devices, such as a digital camera or digital camera enabled smart phone, which may be capable of digitally capturing an image or a stream of images of fastener hole 1705. The image-capturing system 1710 may be, but is not limited to, a charge-coupled device camera (CCD), a complementary metal oxide semiconductor (CMOS) image sensor, and/or a charge injection device (CID). The devices and systems of image capturing system 1710 may comprise physical support structures and digital systems that allow image capturing system 1710 to capture an image or stream of images of fastener hole 1705. The physical support structures may include a device that may be configured to align image-capturing system 1710 with fastener hole 1705, such that an image or stream of images may be captured. The physical support structures may further comprise an illuminations source, a focal length adjuster, and a camera shake stabilizer. An illumination source may comprise a single source of illumination or may be a combination of sources of illumination. Sources of illumination may be, but not limited to, light-emitting diodes, incandescent light bulbs, flash bulbs, gas bulbs, and the like. A focal length adjuster may be, but not limited to, motors built into a lens. An inspection device, camera, physical rotation of a screw adjustment mechanism, a sliding mechanism, and the like may control a focal length adjuster. Adjusting the pan and tilt of a digital capture device reduces blurring associated with the motion of a camera or other imaging device during image capture. Pan and tilt adjusters may comprise motors, gyroscopes, slide adjusters, and the like, Fastener identification system 1770 accepts inputs from a fastener setup screen, as shown in FIG. 6. Fastener identification system 1770 may allow for general inputs that identify a fastener's material, diameter, head type, and style. The general inputs may allow a user to use the hole inspection system 1700 before detailed manufacturing information can be input from a table. The input for a fastener's material may be, but not limited to, metal, composites, aluminum, steel, titanium, and superalloys, such as Monel®, Iconel®, and Hastalloy®. Each fastener material has specific material properties such as compressive strength, density, ductility, fatigue limit, fracture toughness, and the like. The diameter of a fastener typically ranges, but is not limited to, 0.06 to 2.0 inches in diameter. Fastener head types may be, but are not limited to, oval, panhead, roundhead, truss head, countersunk head, and the like. Fastener styles may be, but are not limited to, counter sunk head, not countersunk, shank, no shank, and the like. Fastener identification system 1770 may also accept predefined manufacture fastener specifications for inspection. A table of manufacture fastener specifications may be an accessible database of manufacture specifications, a user updateable table of manufacture specifications, an electronic format file that may be saved on hole inspection system 1700, and the like. Fastener identification system 1770 sends or provides the specified data to the image processing system.

Image processing system 1760 may be configured to automatically process a digital image or stream of images from image capturing system 1710. The automatic processing of an image may be initiated by a user activating an image capture, software-initiated image capture, and the like. Image processing system 1760 may comprise dedicated hardware used to process the image obtained from image capturing system 1710. The dedicated hardware may be, but is not limited to, a central processing unit (CPU), graphics processing unit (GPU), field programmable gate array (FPGA), a digitizer, an arithmetic logic unit (ALU), and the like. Image processing system 1760 may be configured to associate fastener identification system 1770 data with the captured image of image-capturing device 1710. Fastener association may be a software-enabled function that identifies and measures fastener and/or fastener hole features in an image. Fastener association may identify fasteners and a fastener hole in an image or video and determine whether a fastener may be centered relative to the fastener hole.

The system for measuring concentricity 1780 may be configured to accept the processed image from image processing system 1760 and associated fastener identification 1770 data. The system for measuring concentricity 1780 may comprise, but is not limited to, deriving a median axis of the fastener hole, fixing the datum axis (theoretical axis), finding the center point for one cross-section, repeating for multiple cross-sections across the cylindrical fastener hole, and checking where the measured axis lies. The system for measuring concentricity 1780 may be configured to identify the center of a fastener hole 1705 or the center of fastener cut head 915 and a fastener cut indicator 905, as shown in FIG. 9. The system for measuring concentricity 1780 should be configured to identify any amount of concentricity error from the CL offset 920 between the center of a fastener hole 1705, or a center of fastener cut head 915, and a fastener cut indicator 905, as shown in FIG. 9. Concentricity error may be, but is not limited to, determining the fastener wall thickness, a measurement between the outside diameter (OD), and inside diameter (ID) of a fastener hole and correlate this to the specification of a fastener.

The system for identifying irregularities 1785 may be configured to accept the image from image processing system 1760 and associated fastener identification 1770 data and determine any irregularities in the captured image of the fastener hole 1705 using the fastener identification system 1770 data. Irregularity recognition refers to a collection of related tasks for identifying irregularities in a digital image of a fastener hole. Irregularities may include, but are not limited to, material degradation, concentricity of the fastener hole, a flaw, a finding of concentricity failure, and the like. Irregularities may come in the form of damaged material 980, as shown in FIG. 13, crescent-shaped artifacts 1480, as shown in FIG. 14, and nonuniform and random twist drill damaged material 1480, as shown in FIG. 14. A system for identifying irregularities 1785 may be, but are not limited to, algorithms and deep learning models such as convolutional neural networks, conventional neural networks, and pre-trained deep learning models such as AlexNet or GoogLeNet, and the like.

A damage determination 1790 of the hole inspection system 1700 may be a product of firmware and/or internal software, the system for measuring concentricity 1780, the system for identifying irregularities 1785, or an offline decision-making authority 1795. A damage determination 1790 may be, but is not limited to, a failure to meet tolerances, structural integrity, material integrity, and the like. The offline decision-making authority 1795 may be a cloud-based processing system, one or more algorithms, an individual inspector, a quality assurance group, a convolutional neural network, conventional neural networks, a pre-trained deep learning model such as AlexNet or GoogLeNet, and the like.

A rectification analysis 1800 may be a suggested corrective action. Corrective actions may include, but are not limited to, drilling the fastener hole slightly oversize, welding a patch, filling the fastener hole by welding and then redrilling, and the like. Similarly, composite structural materials would be bonded, filled, bushed. Metal aircraft structures would be drilled or drilled and bushed. Where welding may not be an acceptable repair welding may be used for other structural applications. The rectification analysis 1800 may be an automated output. An automated rectification analysis 1800 may be a product of a fastener identification system 1770 parameters and surface structure parameters. The rectification analysis 1800 may be, but not limited to, a cloud-based processing system, an individual inspector, a quality assurance group, convolutional neural networks, conventional neural networks, a pre-trained deep learning model such as AlexNet or GoogLeNet, and the like.

Maintenance record system 1810 may record date, time, defect size, GPS location of the fastener hole, irregularity, rectification recommendation, inspector identification, fastener type, subassembly information, and a Federal Aviation Administration ("FAA") certification. Maintenance record system 1810 may record information or comprise one or more unique identifiers/identification mechanisms, such as, but not limited to, a bar code, a QR code, a RFID, and the like. Maintenance record system 1810 may be, but is not limited to, a logbook, an electronically recorded log, a cloud-based database, and the like.

Mobile embedded system 1740 may have numerous functional capabilities such as, but not limited to, digital image-capturing, image processing, software application, measuring, physical support, illumination, focal length adjustment, pan and tilt adjustment, user input, data input, and the like. Although individual image-capturing system 1710 and image processing system 1760 may be utilized, the present disclosure is not limited to a specific device, and the use of various modern mobile embedded systems 1740 may be, but not limited to, mobile phones, tablets, computers, application specific embedded systems, and the like.

Computing and information system 1750 may provide many services and functions such as, but not limited to, image processing, fastener identification, measuring, identifying irregularities, damage determination, offline decision making, rectification analysis, and maintenance recording, and the like.

Corrective system 1755 may provide several services such as, but not limited to, off-line decision making and rectification of damage. An off-line decision making may be, but not limited to, individual or a group of technician(s) or engineer(s), a pre-trained deep learning model such as AlexNet or GoogLeNet, and the like. A rectification analysis 1800 may be, but not limited to, a suggested corrective action from, but not limited to, individual or a group of technician(s) or engineer(s), a pre-trained deep learning model such as AlexNet or GoogLeNet, and the like.

The device of the present disclosure has been presented in an illustrative style. The terminology employed throughout should be read in an exemplary rather than a limiting manner. While various exemplary embodiments have been shown and described, it should be apparent to one of ordinary skill in the art that there are many more embodiments that are within the scope of the present disclosure. Accordingly, the present disclosure is not to be restricted, except in light of the appended claims and their equivalents.

Various embodiments presented in terms of systems may comprise a number of components, modules, and the like. It is to be understood and appreciated that the various systems may include additional components, modules, etc. and/or may not include all of the components, modules, etc. discussed in connection with the figures. A combination of these approaches may also be used.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. An inspection device comprising:
a housing;
a diffuser;
a display screen;
a processor;
a graphics processor;
a digital image capture device;
a power source;
graphics processor;
wherein said graphics processor is configured to overlay an offset overlay on a digitally displayed image of an inspection site;
wherein said display screen is configured to display said inspection site, said offset overlay, and a plurality of fastener setup data;
wherein said processor is configured to process said plurality of fastener setup data and said offset overlay;
wherein said processor determines an offset value from said offset overlay and said digitally displayed image.

2. The inspection device of claim 1, further comprising a foot, a hand grip, a diffuser, and a lighting assembly;
wherein said lighting assembly is configured to provide illumination; and
wherein said diffuser is configured to scatter said illumination on to said inspection site.

3. The inspection device of claim 1, wherein said digital image capture device is a charge coupled device configured to digitally capture an image of said inspection site.

4. The inspection device according to claim 1, wherein said digital image capture device is configured to capture an image of a fastener hole at said inspection site, maintain focal length, and accept focus control from said processor.

5. The inspection device according to claim 1, wherein said plurality of fastener setup data comprises one or more of: a fastener material; a fastener diameter; a fastener head type; a fastener style; and combinations thereof.

6. The inspection device according to claim 1, wherein said offset value a damage determination.

7. The inspection device according to claim 1, wherein said processor provides a rectification analysis comprising one or more of: a removal process offset; a recommended rectification; and combinations thereof;
wherein said removal process offset is an over-drill size of a fastener hole.

8. The inspection device of claim 1, wherein said inspection device is further configured to generate maintenance record data;
wherein said maintenance record data comprises one or more of: a date; a time; a defect size; a GPS location of said fastener hole; an irregularity; a rectification recommendation; an inspector ID; a fastener type; a sub-assembly information; a Federal Aviation Administration Certification; and combinations thereof.

9. The inspection device according to claim 6, wherein said processor records a maintenance record to a maintenance record system;
wherein said maintenance record system comprises one or more identifiers;
wherein said one or more identifiers are selected from the group of identifiers consisting of: a bar-code; a QR code; a radiofrequency identification (RFID); and combinations thereof; and
wherein said one or more identifiers are associated with said damage determination and a rectification analysis.

10. An inspection device comprising:
a housing;
a hand grip;
a diffuser;
a foot;
a display screen;
a processor;
a graphics processor;

a digital image capture device;
a power source;
graphics processor;
a lighting assembly; and
a diffuser;
wherein said lighting assembly is configured to supply a light;
wherein said diffuser is configured to scatter said light on an inspection site;
wherein said diffuser is configure to removably attach to said housing;
wherein said graphics processor is configured to overlay an offset overlay on a digitally displayed image of an inspection site;
wherein said display screen is configured to display said inspection site, said offset overlay, and a plurality of fastener setup data;
wherein said processor is configured to accept and process a plurality of fastener setup data and said offset overlay;
wherein said processor determines an offset value from said offset overlay and said digitally displayed image;
wherein said digital image capture device is a charge coupled device configured to (i) digitally capture an image of an inspection site and of said fastener hole at said inspection site, (ii) maintain focal length, and (iii) accept focus control from said processor;
wherein said fastener setup data comprises one or more of: a fastener material; a fastener diameter; a fastener head type; and a fastener style;
wherein said offset value of is a damage determination;
wherein said processor provides a rectification analysis comprising: a removal process offset; and a recommended rectification;
wherein said removal process offset is an over-drill size of a fastener hole;
wherein said inspection device is further configured to generate maintenance record data;
wherein said maintenance record data comprises one or more of: a date; a time; a defect size; a GPS location of said fastener hole; an irregularity; a rectification recommendation; an inspector ID; a fastener type; a subassembly information; a Federal Aviation Administration Certification; and
wherein said processor records a maintenance record to a maintenance record system;
wherein said maintenance record system comprises one or more identifiers;
wherein said one or more identifiers are selected from the group of identifiers consisting of: a bar-code; a QR code; a radiofrequency identification (RFID); and combinations thereof; and
wherein said one or more identifiers are associated with said damage determination and said rectification analysis.

* * * * *